(12) United States Patent
Seok et al.

(10) Patent No.: US 11,457,160 B2
(45) Date of Patent: Sep. 27, 2022

(54) ELECTRONIC DEVICE AND METHOD FOR ADJUSTING COLOR OF IMAGE DATA BY USING INFRARED SENSOR

(71) Applicant: Samsung Electronics Co., Ltd., Suwon-si (KR)

(72) Inventors: Jinkeun Seok, Suwon-si (KR); Jaehee Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/811,686

(22) Filed: Mar. 6, 2020

(65) Prior Publication Data
US 2020/0288072 A1 Sep. 10, 2020

(30) Foreign Application Priority Data

Mar. 7, 2019 (KR) .................. 10-2019-0026361

(51) Int. Cl.
*H04N 5/33* (2006.01)
*H04N 5/225* (2006.01)
(Continued)

(52) U.S. Cl.
CPC .............. *H04N 5/332* (2013.01); *G02B 5/208* (2013.01); *H04N 5/2254* (2013.01); *H04N 9/735* (2013.01); *H04N 5/23229* (2013.01)

(58) Field of Classification Search
CPC .... G02B 5/208; H04N 9/735; H04N 9/04517; H04N 5/23229; H04N 5/332; H04N 5/3572
See application file for complete search history.

(56) References Cited

U.S. PATENT DOCUMENTS

| 5,099,313 A | 3/1992 | Suemoto et al. |
| 7,170,046 B2 | 1/2007 | Higashitsutsumi |

(Continued)

FOREIGN PATENT DOCUMENTS

| JP | 2006-222543 A | 8/2006 |
| JP | 2015-162874 A | 9/2015 |

(Continued)

OTHER PUBLICATIONS

International Search Report dated Jun. 24, 2020, issued in International Application No. PCT/KR2020/003194.

(Continued)

*Primary Examiner* — Jayanti K Patel
*Assistant Examiner* — Christopher Kingsbury Glover
(74) *Attorney, Agent, or Firm* — Jefferson IP Law, LLP

(57) ABSTRACT

An electronic device and a method for adjusting a color of image data by using an infrared sensor are provided. The electronic device includes a lens, an infrared filter, an image sensor, an infrared sensor and at least one processor operably coupled to the image sensor and the infrared sensor. The at least one processor receives image data that is based on external light passing through the lens and the infrared filter and arriving at the image sensor, from the image sensor, and identifies an intensity of infrared light included in the external light, at least based on sensor data of the infrared sensor, and in response to the identifying of the intensity of the infrared light, adjusts a color of at least portion of the image data at least based on the intensity of the infrared light.

20 Claims, 15 Drawing Sheets

(51) Int. Cl.
*G02B 5/20* (2006.01)
*H04N 9/73* (2006.01)
*H04N 5/232* (2006.01)

(56) References Cited

U.S. PATENT DOCUMENTS

| | | | |
|---|---|---|---|
| 8,228,406 B2 * | 7/2012 | Kuo | H04N 5/3572 348/251 |
| 8,357,899 B2 | 1/2013 | Liu et al. | |
| 9,307,120 B1 * | 4/2016 | Peng | H04N 9/04515 |
| 9,386,230 B1 * | 7/2016 | Duran | H04N 9/735 |
| 9,386,243 B2 | 7/2016 | Lim et al. | |
| 10,511,821 B2 | 12/2019 | Lee | |
| 2006/0045512 A1 | 3/2006 | Imamura et al. | |
| 2016/0165202 A1 * | 6/2016 | Lee | H04N 5/332 348/164 |
| 2019/0045162 A1 * | 2/2019 | Krestyannikov | H04N 9/735 |

FOREIGN PATENT DOCUMENTS

| | | |
|---|---|---|
| JP | 2018-207497 A | 12/2018 |
| KR | 10-2016-0067633 A | 6/2016 |

OTHER PUBLICATIONS

Extended European Search Report dated Jan. 28, 2022, issued in European Patent Application No. 20765890.7.

* cited by examiner

| 2.968 | 2.553 | 2.312 | 2.166 | 2.067 | 2.013 | 1.998 | 2.028 | 2.094 | 2.206 | 2.371 | 2.616 | 3.017 |
|---|---|---|---|---|---|---|---|---|---|---|---|---|
| 2.456 | 2.223 | 2.039 | 1.900 | 1.809 | 1.757 | 1.744 | 1.767 | 1.830 | 1.940 | 2.093 | 2.289 | 2.515 |
| 2.153 | 1.955 | 1.780 | 1.652 | 1.575 | 1.537 | 1.524 | 1.542 | 1.596 | 1.686 | 1.829 | 2.017 | 2.219 |
| 1.917 | 1.735 | 1.585 | 1.481 | 1.413 | 1.380 | 1.367 | 1.385 | 1.432 | 1.507 | 1.624 | 1.795 | 1.986 |
| 1.742 | 1.580 | 1.452 | 1.357 | 1.293 | 1.260 | 1.250 | 1.266 | 1.307 | 1.377 | 1.483 | 1.626 | 1.800 |
| 1.620 | 1.478 | 1.356 | 1.268 | 1.206 | 1.165 | 1.151 | 1.169 | 1.214 | 1.284 | 1.384 | 1.515 | 1.668 |
| 1.541 | 1.407 | 1.291 | 1.204 | 1.134 | 1.087 | 1.069 | 1.088 | 1.141 | 1.219 | 1.318 | 1.444 | 1.584 |
| 1.499 | 1.364 | 1.253 | 1.164 | 1.085 | 1.035 | 1.015 | 1.035 | 1.088 | 1.174 | 1.276 | 1.400 | 1.535 |
| 1.483 | 1.348 | 1.240 | 1.150 | 1.070 | 1.018 | 1.000 | 1.019 | 1.072 | 1.158 | 1.262 | 1.383 | 1.516 |
| 1.496 | 1.363 | 1.255 | 1.166 | 1.087 | 1.036 | 1.020 | 1.038 | 1.090 | 1.174 | 1.275 | 1.397 | 1.530 |
| 1.539 | 1.402 | 1.294 | 1.208 | 1.135 | 1.088 | 1.072 | 1.089 | 1.141 | 1.218 | 1.315 | 1.439 | 1.577 |
| 1.615 | 1.473 | 1.358 | 1.273 | 1.208 | 1.167 | 1.154 | 1.173 | 1.218 | 1.286 | 1.383 | 1.514 | 1.658 |
| 1.730 | 1.574 | 1.456 | 1.363 | 1.300 | 1.264 | 1.253 | 1.272 | 1.314 | 1.380 | 1.482 | 1.622 | 1.780 |
| 1.898 | 1.726 | 1.592 | 1.490 | 1.420 | 1.383 | 1.374 | 1.394 | 1.438 | 1.513 | 1.624 | 1.775 | 1.957 |
| 2.117 | 1.939 | 1.777 | 1.660 | 1.581 | 1.542 | 1.533 | 1.553 | 1.606 | 1.688 | 1.812 | 1.993 | 2.200 |
| 2.423 | 2.219 | 2.036 | 1.896 | 1.804 | 1.757 | 1.744 | 1.773 | 1.830 | 1.932 | 2.078 | 2.289 | 2.524 |
| 2.957 | 2.569 | 2.335 | 2.177 | 2.074 | 2.017 | 2.004 | 2.033 | 2.108 | 2.228 | 2.399 | 2.650 | 3.062 |

| BV | IR Low Threshold | IR High Threshold |
|----|------------------|-------------------|
| -2 | 60 | 100 |
| 0 | 300 | 450 |
| 3 | 1200 | 1400 |
| 5 | 1800 | 2200 |

| Brightness | Room | | | | | | Outdoors | |
|---|---|---|---|---|---|---|---|---|
| Color temperature | 3000K or less | | 3000K~4000K | | 4000K or more | | Whole region | |
| IR Quantity | Less IR | More IR | Less IR | More IR | Less IR | More IR | Less IR | More IR |
| LSC Table | LSC table 2 | LSC table 3 | LSC table 1 | LSC table 3 | LSC table 1 | LSC table 3 | LSC table 2 | LSC table 4 |

FIG.10

ELECTRONIC DEVICE AND METHOD FOR ADJUSTING COLOR OF IMAGE DATA BY USING INFRARED SENSOR

CROSS-REFERENCE TO RELATED APPLICATION(S)

This application is based on and claims priority under 35 U.S.C. § 119(a) of a Korean patent application number 10-2019-0026361, filed on Mar. 7, 2019, in the Korean Intellectual Property Office, the disclosure of which is incorporated by reference herein in its entirety.

BACKGROUND

1. Field

The disclosure relates to an electronic device and a method for adjusting a color of image data by using an infrared sensor.

2. Description of Related Art

With the recent growth of digital technologies, various types of electronic devices are being used widely, such as mobile communication terminals, smart phones, tablet Personal Computers (PCs), electronic organizers, Personal Digital Assistants (PDAs), wearable devices, etc. The electronic device can include one or more cameras for capturing a subject. External light arriving at the camera can be electrically processed by an image sensor of the electronic device and/or an image signal processor (ISP) thereof.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device and a method for adjusting a color of image data by using an infrared sensor.

External light arriving at an image sensor of a camera of an electronic device can be distorted by a lens and/or an infrared filter which the external light passes through. The electronic device can compensate for the distortion based on a brightness of the external light and a color temperature thereof. In order for the electronic device to more accurately compensate for the distortion of the external light caused by the lens and/or the infrared filter, the electronic device can require a way for compensating for the distortion based on an intensity of infrared light included in the external light.

Technological solutions the document seeks to achieve are not limited to the above-mentioned technological solutions, and other technological solutions not mentioned above would be able to be clearly understood by a person having ordinary skill in the art from the following statement.

Additional aspects will be set forth in part in the description which follows and, in part, will be apparent from the description, or may be learned by practice of the presented embodiments.

In accordance with an aspect of the disclosure, an electronic device is provided. The electronic device includes a lens, an infrared filter, an image sensor, an infrared sensor and at least one processor operably coupled to the image sensor and the infrared sensor. The at least one processor receives image data that is based on external light passing through the lens and the infrared filter and arriving at the image sensor, from the image sensor, and identifies an intensity of infrared light included in the external light, at least based on sensor data of the infrared sensor, and in response to the identifying of the intensity of the infrared light, adjusts a color of at least portion of the image data at least based on the intensity of the infrared light.

In accordance with another aspect of the disclosure, a method of the electronic device is provided. The method includes receiving image data that is based on external light passing through a lens and infrared filter of the electronic device and arriving at an image sensor of the electronic device, from the image sensor, and identifying an intensity of infrared light included in the external light, at least based on sensor data of the infrared sensor of the electronic device, and in response to the identifying of the intensity of the infrared light, adjusting a color of at least portion of the image data at least based on the intensity of the infrared light.

In accordance with another aspect of the disclosure, an electronic device is provided. The electronic device includes an image sensor, an infrared sensor and at least one processor operably coupled to the image sensor and the infrared sensor. The at least one processor receives first image data from the image sensor, and in response to the receiving of the first image data, identifies a brightness and color temperature of the first image data, and identifies an intensity of infrared light included in external light related to the first image data, from the infrared sensor, and adjusts a color of at least portion of second image data received from the image sensor after the receiving of the first image data, based on at least one of the identified brightness, color temperature, or intensity of the infrared light.

An electronic device of various embodiments and a method thereof may provide image data of an enhanced quality by more accurately compensating for or correcting the distortion of external light caused by a lens and/or an infrared filter based on an intensity of infrared light included in the external light.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 8A and 8B are diagrams illustrating lens shading correction (LSC) information used by an electronic device according to various embodiments of the disclosure;

FIGS. 9A and 9B are diagrams illustrating an operation in which an electronic device selects LSC information based on a brightness of external light according to various embodiments of the disclosure;

FIG. 10 is a diagram illustrating an operation in which an electronic device selects LSC information based on a color temperature of external light according to an embodiment of the disclosure.

Throughout the drawings, it should be noted that like reference numerals are used to depict the same or similar elements, features, and structures.

DETAILED DESCRIPTION

Figure 1:
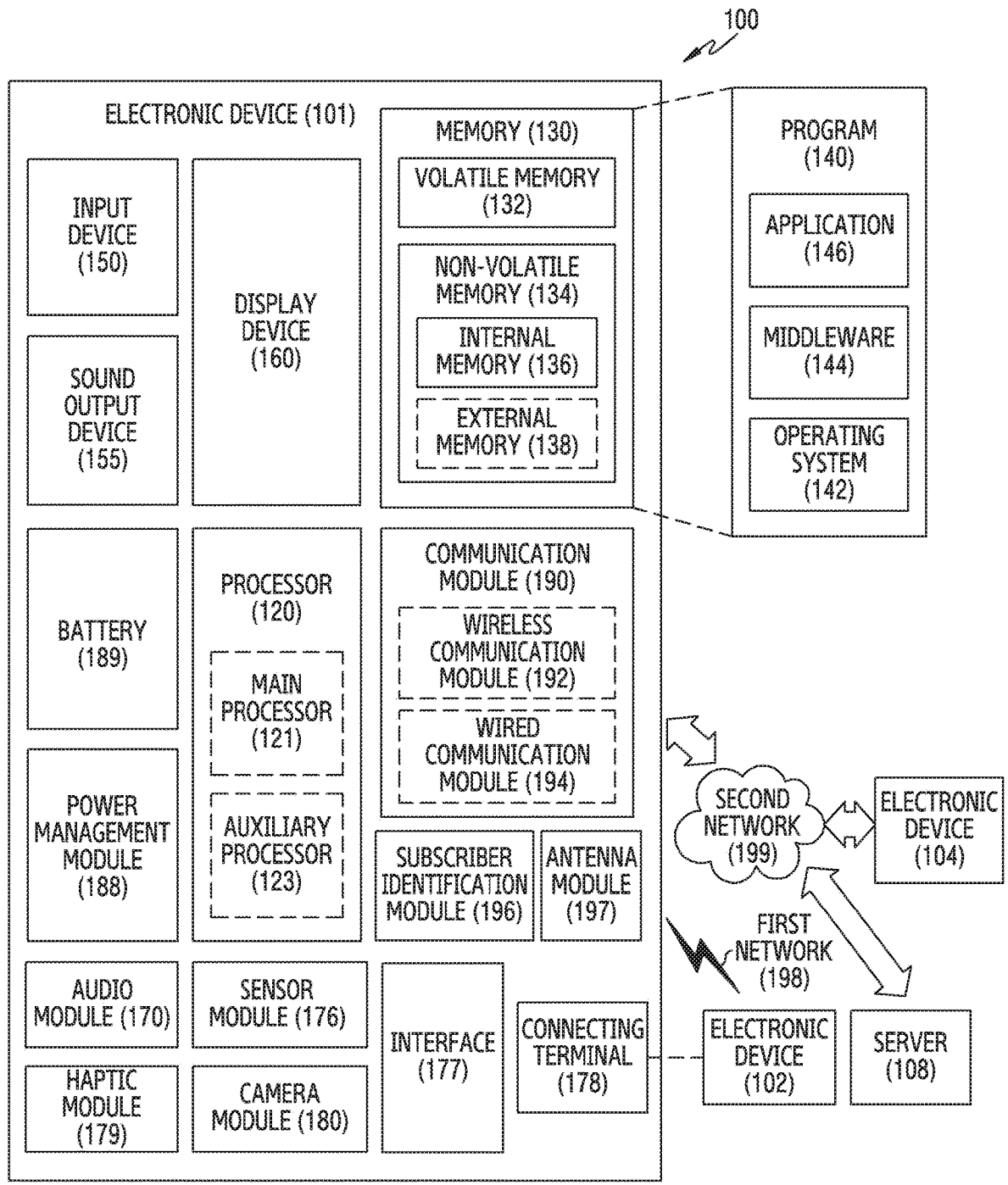
FIG. 1 is a block diagram of an electronic device within a network environment according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the document, the expressions "have", "may have", "comprise", "may comprise", etc. indicate the existence of a corresponding feature (e.g., a constituent element, such as a numerical value, a function, an operation, a part or the like), and do not exclude the existence of an additional feature.

In the document, the expression "A or B", "at least one of A or/and B", "one or more of A or/and B" or the like may include all available combinations of items enumerated together. For example, "A or B", "at least one of A and B" or "at least one of A or B" may denote all (1) including at least one A, (2) including at least one B or (3) including all of at least one A and at least one B.

The expression "a first", "a second", "the first", "the second" or the like may use various constituent elements irrespective of order and/or importance, and are nothing but used to distinguish a constituent element from another constituent element and do not limit the corresponding constituent elements. For example, a first user device and a second user device may represent mutually different user devices, regardless of order or importance. For example, a first constituent element may be named a second constituent element without departing from the scope of right mentioned in the document. Likely, even a second constituent element may be named interchangeably with a first constituent element.

When it is mentioned that some constituent element (e.g., a first constituent element) is "(operatively or communicatively) coupled with/to" or is "connected to" another constituent element (e.g., a second constituent element), it will have to be understood that the some constituent element may be directly coupled to the other constituent element, or be coupled to the other constituent element through a further constituent element (e.g., a third constituent element). On the other hand, when it is mentioned that some constituent element (e.g., a first constituent element) is "directly coupled to" another constituent element (e.g., a second constituent element) or is "directly connected to", it may be understood that a further constituent element (e.g., a third constituent element) does not exist between the some constituent element and the other constituent element.

The expression "configured (or set) to~" used in the document may be used interchangeably with, for example, "suitable for~", "having the capacity to~", "designed to~", "adapted to~", "made to~" or "capable of~" according to context. The term "configured (or set) to~" may not necessarily mean only "specifically designed to" in hardware. Instead, in some context, the expression "device configured to~" may mean that the device is "capable of~" together with other devices or parts. For example, the phrase "processor configured (or set) to perform A, B, and C" may mean an exclusive processor (e.g., an embedded processor) for performing a corresponding operation, or a generic-purpose processor (e.g., a central processing unit (CPU) or an application processor (AP)) capable of performing corresponding operations by executing one or more software programs stored in a memory device.

The terms used in the document are terms used to just explain specific embodiments, and may not intend to limit the scope of other embodiments. The terms used herein inclusive of technological or scientific terms may have the same meaning as those commonly understood by a person having ordinary skill in the art mentioned in the document. Among the terms used in the document, the terms defined in a general dictionary may be interpreted as having the same or similar meanings to the contextual meanings of a related technology, and are not interpreted as having ideal or excessively formal meanings unless defined clearly in the document. According to cases, even the terms defined in the document cannot be interpreted to exclude embodiments of the document.

An electronic device of various embodiments of the document may, for example, include at least one of a smart phone, a tablet Personal Computer (PC), a mobile phone, a video phone, an electronic book (e-book) reader, a desktop PC, a laptop PC, a netbook computer, a workstation, a server, a personal digital assistant (PDA), a portable multimedia player (PMP), a moving picture experts group (MPEG-1 or MPEG-2) audio layer 3 (MP3) player, a mobile medical device, a camera or a wearable device. According to various embodiments of the disclosure, the wearable device may include at least one of an accessory type (e.g., a watch, a ring, a wristlet, an anklet, a necklace, glasses, a contact lens, a head-mounted-device (HMD) or the like), a fabric or clothing integrated type (e.g., electronic clothes), a body mount type (e.g., a skin pad or tattoo) or a bio-implant type (e.g., an implantable circuit).

In some embodiments of the disclosure, the electronic device may be a home appliance. The home appliance may, for example, include at least one of a television (TV), a digital video disk (DVD) player, an audio system, a refrigerator, an air conditioner, a cleaner, an oven, a microwave, a washing machine, an air cleaner, a set-top box, a home automation control panel, a security control panel, a TV box (for example, Samsung HomeSync™, Apple TV™ or Google TV™), a game console (e.g., Xbox™, PlayStation™), an electronic dictionary, an electronic locking system, a camcorder, or an electronic frame.

In another embodiment of the disclosure, the electronic device may include at least one of various medical devices (e.g., various portable medical measuring devices (i.e., a blood sugar measuring device, a heart rate measuring device, a blood pressure measuring device, a body temperature measuring device or the like), magnetic resonance angiography (MRA), magnetic resonance imaging (MRI), computerized tomography (CT), a photographing machine, an ultrasonic machine or the like), a navigation device, a global navigation satellite system (GNSS), an event data recorder (EDR), a flight data recorder (FDR), a car infotainment device, an electronic equipment for ship (e.g., a navigation device for ship, a gyrocompass, etc.), avionics, a security device, a head unit for car, an industrial or home robot, an automatic teller's machine (ATM) of a financial institution, a point of sales (POS) of a shop or an Internet of things (IoT) device (e.g., an electric bulb, various sensors, an electricity or gas meter, a sprinkler device, a fire alarm, a thermostat, a streetlight, a toaster, an exerciser, a hot water tank, a heater, a boiler, etc.).

According to some embodiment of the disclosure, the electronic device may include at least one of a part of furniture or building/structure, an electronic board, an electronic signature receiving device, a projector or various metering devices (e.g., a tap water, electricity, gas or radio wave metering device, etc.). In various embodiments of the disclosure, the electronic device may be a combination of one or more of the aforementioned various devices. The electronic device of some embodiment may be a flexible electronic device or a foldable electronic device. In addition, the electronic device of an embodiment of the document is not limited to the aforementioned devices, and may include a new electronic device being based on technology growth.

In the document, the term 'user' may denote a person who uses the electronic device or a device (e.g., an artificial-intelligence electronic device) which uses the electronic device.

Various embodiments are described below with reference to the accompanying drawings. However, the sizes of constituent elements in the drawings may be exaggerated or reduced for description convenience's sake. For instance, a size and thickness of each constituent element shown in the drawings are arbitrarily shown for description convenience's sake and therefore, the disclosure is not necessarily limited to the illustrated drawings.

FIG. 1 is a block diagram illustrating an electronic device within a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment of the disclosure, the electronic device 101 may communicate with the electronic device 104 via the server 108. According to an embodiment of the disclosure, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments of the disclosure, at least one (e.g., the display device 160 or the camera module 180) of the components may be omitted from the electronic device 101, or one or more other components may be added in the electronic device 101. In some embodiments of the disclosure, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment of the disclosure, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming call. According to an embodiment of the disclosure, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment of the disclosure, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment of the disclosure, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment of the disclosure, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., printed circuit board (PCB)). According to an embodiment of the disclosure, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment of the disclosure, all or some of operations to be executed at the electronic device 101 may be executed at one or more of the external electronic devices 102, 104, or #08. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
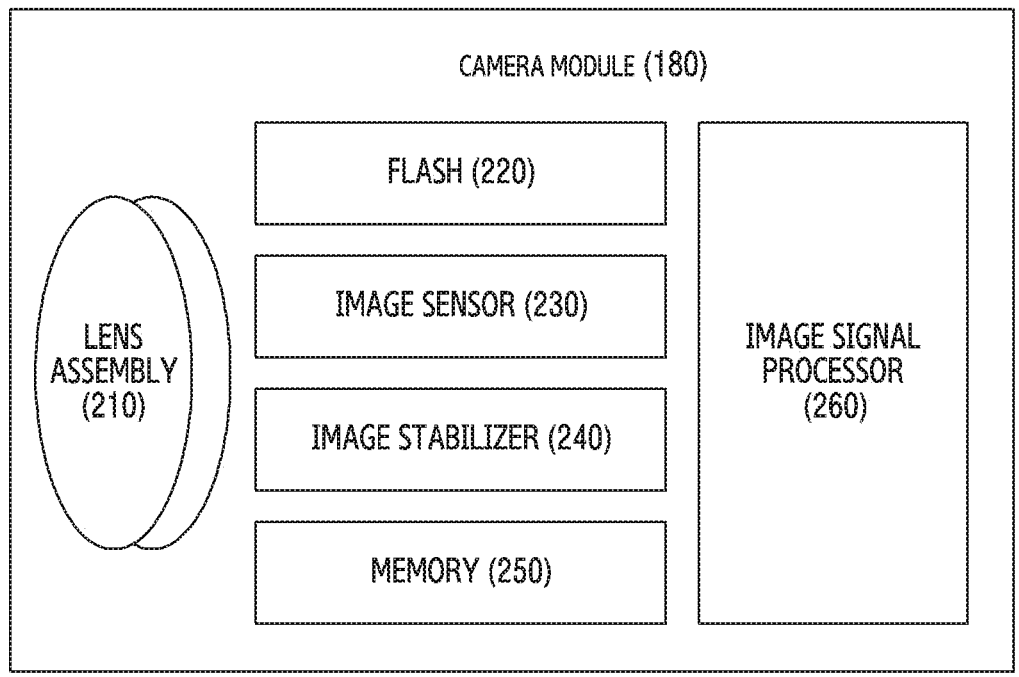
FIG. 2 is a block diagram illustrating a camera module according to an embodiment of the disclosure.

FIG. 2 is a block diagram illustrating a camera module according to an embodiment of the disclosure.

Referring to FIGS. 1 and 2, the camera module 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment of the disclosure, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment of the disclosure, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment of the disclosure, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment of the disclosure, the image stabilizer 240 may detect such a movement by the camera module 180 or the electronic device 101 using a gyro sensor (not shown) or an acceleration sensor (not shown) disposed inside or outside the camera module 180. According to an embodiment of the disclosure, the image stabilizer 240 may be implemented, for example, as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the image signal processor 260. According to an embodiment of the disclosure, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display device 160, the electronic device 102, the electronic device 104, or the server 108) outside the camera module 180. According to an embodiment of the disclosure, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display device 160 as it is or after being further processed.

According to an embodiment of the disclosure, the electronic device 101 may include a plurality of camera module 180 having different attributes or functions. In such a case, at least one of the plurality of camera module 180 may form, for example, a wide-angle camera and at least another of the plurality of camera module 180 may form a telephoto camera. Similarly, at least one of the plurality of camera module 180 may form, for example, a front camera and at least another of the plurality of camera module 180 may form a rear camera.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

Figure 3A:
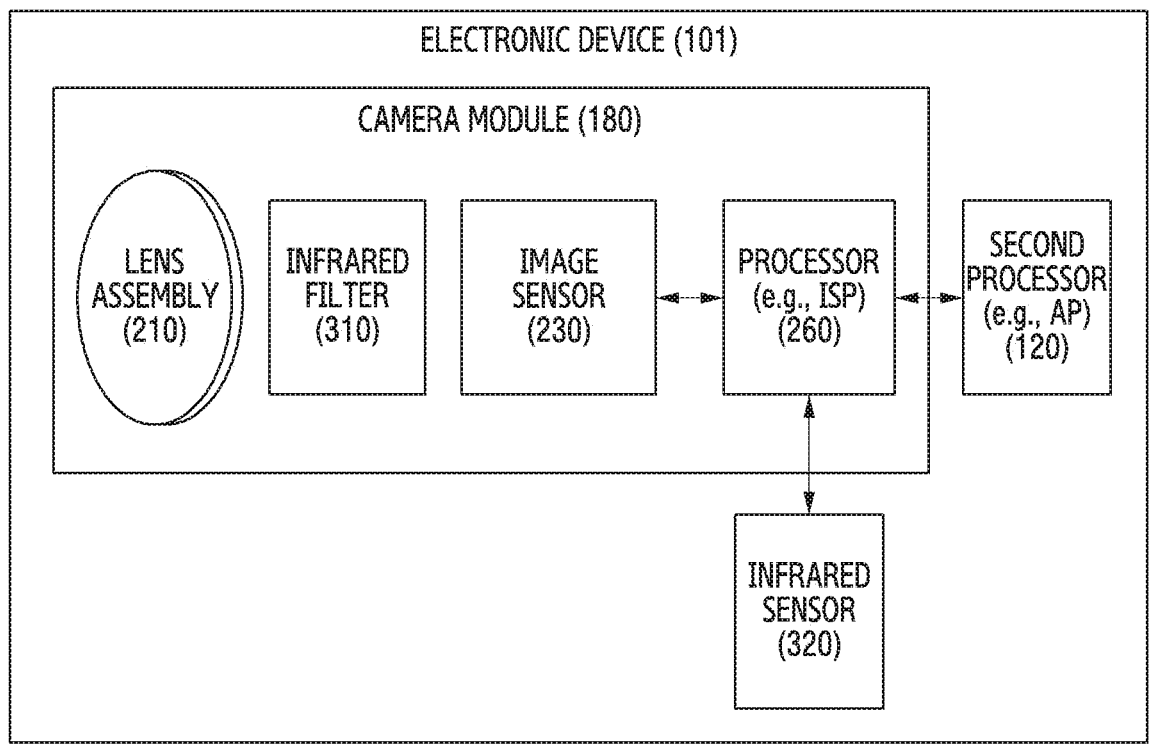
FIGS. 3A and 3B are diagrams illustrating a hardware component comprised in an electronic device according to various embodiments of the disclosure.
Figure 3B:
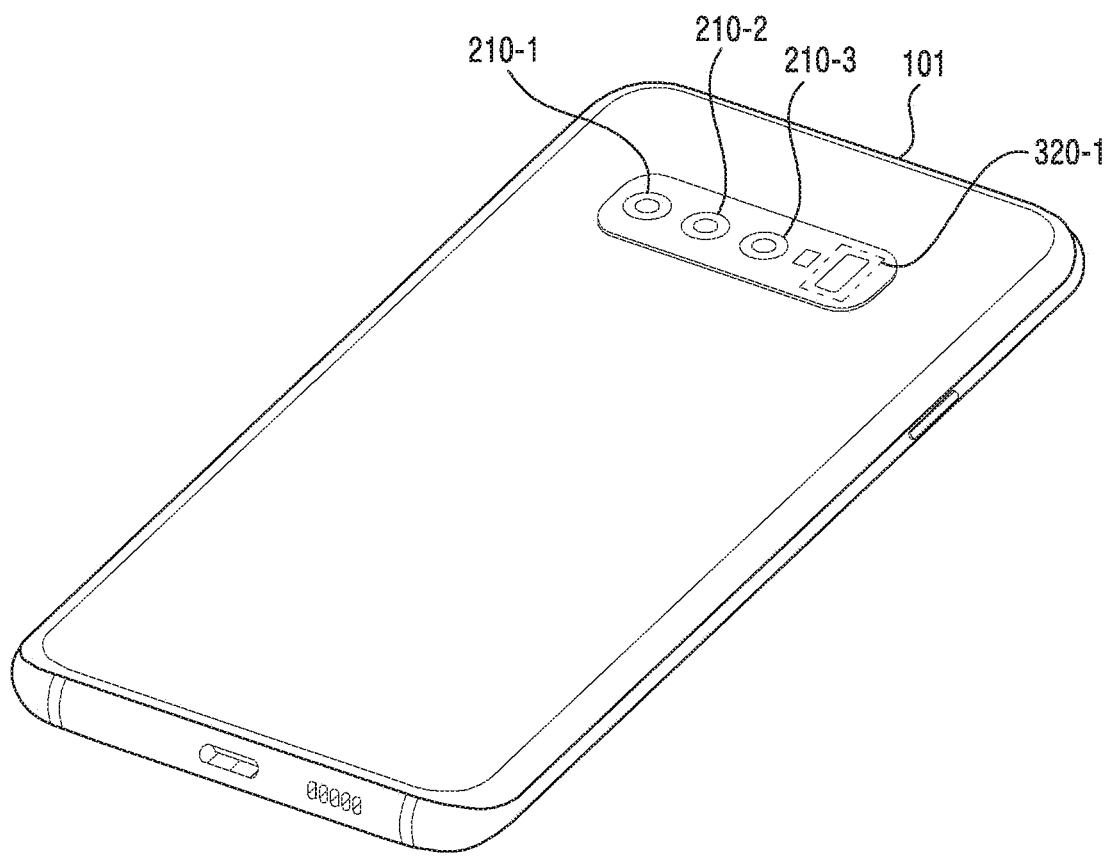

FIGS. 3A to 3B are diagrams illustrating a hardware component included in an electronic device according to various embodiments of the disclosure.

Referring to FIGS. 3A to 3B, the electronic device 101 of FIGS. 3A to 3B may correspond to the electronic device 101 of FIG. 1 or FIG. 2. The electronic device 101 may be a smart phone, a PDA, a tablet PC, such as a smart pad, a desktop PC and/or a laptop PC. According to various embodiments of the disclosure, the electronic device 101 may be an embedded PC which may be included as a part of another electronic device, or may be a wearable device, such as a smart watch.

The electronic device 101 may include a camera module 180 which includes a lens assembly 210, an infrared filter 310, an image sensor 230 and a processor 260. The camera module 180 may be operatively and/or electrically connected to other hardware components of the electronic device 101, for example, a second processor 120 and an infrared sensor 320. The second processor 120 may correspond to the processor 120 (for example, the application processor (AP)) of FIG. 1 to FIG. 2. The camera module 180, the second processor 120 and the infrared sensor 320 may, for example, be connected by an electrical interface, such as a communication bus (not shown).

The lens assembly 210 and the image sensor 230 included in the camera module 180 may correspond to the lens assembly 210 and the image sensor 230 of FIG. 2. The processor 260 may correspond to the ISP 260 of FIG. 2. One camera module 180 is illustrated in FIG. 3A, but the number of the camera module 180 included in the electronic device 101 may be varied according to an embodiment. Below, the lens assembly 210 and the camera module 180 may refer to a lens and a camera, respectively. Below, the ISP may refer to the processor 260.

In an embodiment of the disclosure, at least a portion of the lens assembly 210 may be exposed to outside through a housing of the electronic device 101. External light emitted toward the lens assembly 210 from a subject may be propagated into the electronic device 101 and/or the camera module 180 through the lens assembly 210. The external light passing through the lens assembly 210 may pass through the infrared filter 310 and then arrive at the image sensor 230. The infrared filter 310 may reduce and/or block a component of an infrared wavelength band of the external light arriving at the image sensor 230.

The image sensor 230 may include pixels arrayed in two dimensions. The image sensor 230 may convert an image formed through a lens into an electrical signal of a pixel unit, based on the photoelectric effect. The pixels may include a plurality of photodiodes (PDs), respectively. The plurality of PDs may convert an optical signal into an electrical signal based on the photoelectric effect. Each of the plurality of PDs within any one pixel of the image sensor 230 may receive light (for example, red light, blue light and green light) of mutually different wavelength bands, and output an electrical signal that is based on an intensity of the received light. Each of the plurality of PDs within any one pixel of the image sensor 230 may be arranged based on a specified pattern, such as a bayer pattern.

The image sensor 230 may output image data to the processor 260 according to a specified time point and/or cycle. The image data may include data corresponding to an electrical signal of each of the plurality of pixels included in the image sensor 230 and the plurality of PDs included in the pixels. For example, the data corresponding to the electrical signal of each of the plurality of PDs may be aligned, based on the arrangement of the plurality of PDs of the bayer pattern within the image data and the arrangement of the plurality of pixels within the image sensor 230.

According to various embodiments of the disclosure, the processor 260 may perform image processing related to image data. The image processing may include, for example, auto exposure (AE), auto white balance (AWB), de-mosaic, color interpolation (CI), gamma correction, edge enhancement (EE), noise reduction (NR), etc. The order of the image processing performed by the processor 260 is described with reference to FIG. 4.

According to various embodiments of the disclosure, the processor 260 may perform image processing which compensates for the distortion of image data provided by the lens assembly 210 and the infrared filter 310. For example, the distortion may include lens shading and/or color shading. For example, the processor 260 may compensate for the distortion of the image data provided by the lens assembly 210 and the infrared filter 310, based on lens shading correction (LSC). The distortion of the image data provided by the lens assembly 210 and the infrared filter 310 may be described with reference to FIGS. 5A to 5B.

In an embodiment of the disclosure, the processor 260 may measure an intensity of infrared light included in external light by using the infrared sensor 320. The infrared sensor 320 may output a digital electrical signal indicating the intensity of the infrared light. By performing LSC based on the measured intensity of the infrared light, the processor 260 may compensate for the distortion of image data provided by the lens assembly 210 and the infrared filter 310. The processor 260 may transmit the image data to which image processing is applied, to the second processor 120.

Referring to FIG. 3B, the arrangement of lens assemblies 210-1, 210-2 and 210-3 and an infrared sensor 320-1 of the electronic device 101 of an embodiment is illustrated. The electronic device 101 may include a plurality of cameras, and the lens assemblies 210-1, 210-2 and 210-3 of the respective plurality of cameras may be exposed to outside through mutually different portions of a housing of the electronic device 101. The infrared sensor 320-1 may, for example, correspond to at least one of a proximity sensor, a heart-rate monitoring (HRM) sensor, an IR dedicated sensor or a time-of-flight (TOF) sensor.

Referring to FIG. 3B, the infrared sensor 320-1 may be arranged in adjacent to the portions of the housing of the electronic device 101 in which the lens assemblies 210-1, 210-2 and 210-3 are exposed. The infrared sensor 320-1 may transmit sensor data indicating an intensity of infrared light included in external light, to at least one of the plurality of cameras corresponding to the lens assemblies 210-1, 210-2 and 210-3. The sensor data may be used for LSC which is performed by at least one of the plurality of cameras. Below, an operation that the camera of the electronic device 101 performs using the sensor data of the infrared sensor 320-1 is described with reference to FIG. 4.

Figure 4:
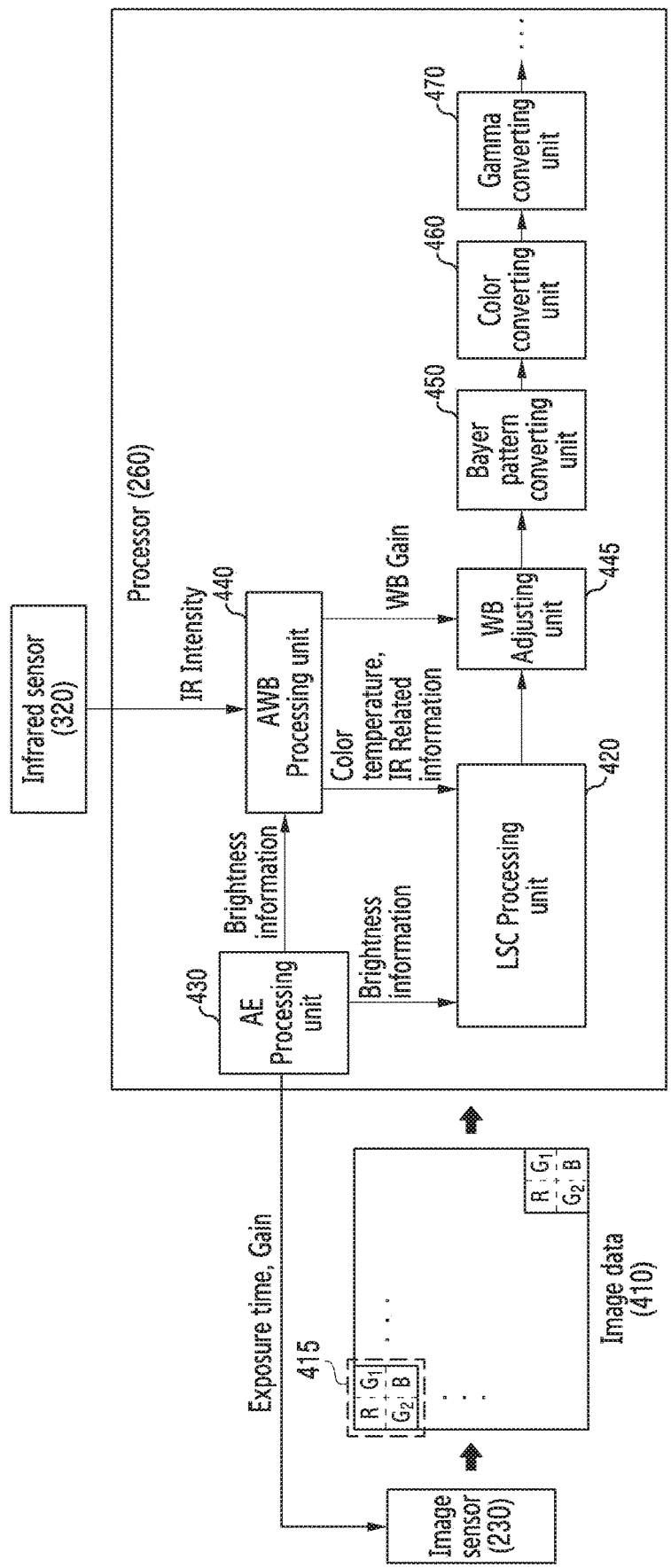
FIG. 4 is a block diagram illustrating an operation performed by a processor of an electronic device according to an embodiment of the disclosure.

FIG. 4 is a block diagram illustrating an operation performed by a processor of an electronic device according to an embodiment of the disclosure.

The electronic device of FIG. 4 may correspond to the electronic device 101 of FIG. 1 to FIG. 2 and FIG. 3A to FIG. 3B. The processor 260 of FIG. 4 may correspond to the processor 260 of FIG. 3A to FIG. 3B and/or the ISP 260 of FIG. 2.

Referring to FIG. 4, an example of a format of image data 410 outputted from the image sensor 230 is illustrated. The image sensor 230 may output the image data 410 to the processor 260 every specified cycle (for example, frame per second (FPS) cycle adjusted among 24 Hz, 60 Hz or 120 Hz). A plurality of pixels included in the image sensor 230 may be arranged based on a two-dimensional array. Within a portion 415 of the image data 410, a color measured in each of a plurality of PDs included in the image sensor 230 may be arranged based on the arrangement (for example, a bayer pattern) of the plurality of PDs.

Referring to FIG. 4, the processor 260 of various embodiments may include an LSC processing unit 420 for performing image processing related to the image data 410, an AE processing unit 430, an AWB processing unit 440, a WB adjusting unit 445, a bayer pattern converting unit 450, a color converting unit 460 and/or a gamma converting unit 470. Each of the LSC processing unit 420, the AE processing unit 430, the AWB processing unit 440, the WB adjusting unit 445, the bayer pattern converting unit 450, the color converting unit 460 and the gamma converting unit 470 may correspond to a plurality of instructions and/or threads executed in the processor 260, or correspond to at least a portion of a circuit for signal processing included in the processor 260.

In response to receiving the image data 410 from the image sensor 230, the processor 260 of an embodiment may compensate for the distortion of lens shading and/or color shading included in the image data 410 based on the LSC processing unit 420. For example, the processor 260 may adjust a color of each of a plurality of pixels included in the image data 410, by using a specified value (for example, gain) being based on positions of the plurality of pixels. The specified value may be related to specified information (for example, a lens shading correction coefficient and/or LSC table) related to LSC.

The processor 260 of an embodiment may process the image data 410, which is processed based on the LSC processing unit 420, based on the AE processing unit 430. The processor 260 may identify a brightness of the image data 410 based on an AE algorithm of the AE processing unit 430. For example, the processor 260 may adjust the brightness of the image data 410 (for example, an average brightness of the plurality of pixels included in the image data 410) to within a specified range, based on the AE processing unit 430. The processor 260 may identify the brightness of the image data 410 based on the AE processing unit 430. The processor 260 may control the LSC processing unit 420 based on the identified brightness of the image data 410, to perform LSC that considers the brightness identified based on the AE processing unit 430. The processor 260 may identify and/or adjust a time exposing the image sensor 230 to external light and a gain of the image sensor 230, based on the AE processing unit 430.

The processor 260 of an embodiment may process the image data 410, which is processed based on the AE processing unit 430, based on the AWB processing unit 440 and/or the WB adjusting unit 445. The processor 260 may identify a color temperature of the image data 410 based on an AWB algorithm of the AWB processing unit 440. For example, the processor 260 may adjust the color temperature of the image data 410 based on the AWB processing unit 440. The processor 260 may identify the color temperature of the image data 410 dependent on Kelvins light temperature (K), based on the AWB processing unit 440. The color temperature may be expressed as Kelvins light temperature (or K value), based on a relationship between a temperature of a black body and a color emitted from the black body. For example, the lower the K value is, the more external light may include red light, and the higher the K value is, the more the external light may include blue light (or purple light).

The color temperature of the image data 410 may be varied according to a type of a light source which emits external light arriving at the image sensor 230. The processor 260 may identify the type of the light source, based on the AWB processing unit 440. By using the WB adjusting unit 445, the processor 260 may adjust a white balance of the image data 410 according to the identified type of the light source. For example, the processor 260 may control the WB adjusting unit 445 based on a white balance gain (WB gain) determined using the AWB processing unit 440, to adjust the white balance of the image data 410. In an embodiment of the disclosure, the processor 260 may adjust the white balance of the image data 410, based on the brightness identified using the AE processing unit 430 and the color temperature identified using the AWB processing unit 440.

When adjusting a color temperature and/or white balance of the image data 410, the processor 260 of various embodiments may use an intensity of infrared light measured by the infrared sensor 320. For example, the processor 260 may identify a type of a light source related to external light arriving at the image sensor 230, based on a brightness identified using the AE processing unit 430, a color temperature identified using the AWB processing unit 440, and an intensity of infrared light measured by the infrared sensor 320. For example, the processor 260 may identify whether the infrared light is relatively more included in the external light. Information (for example, light source information) related to the type of the light source that the processor 260 identifies using the AWB processing unit 440 may be used in the LSC processing unit 420 in order to compensate for lens shading. Referring to FIG. 4, the processor 260 may compensate for the lens shading included in the image data 410, based on the brightness of the image data 410, the color temperature and the intensity of the infrared light measured from the infrared sensor 320. For example, the processor 260 may compensate for lens shading included in image data received from the image sensor 230 subsequent to the image data 410, based on the brightness of the image data 410, the color temperature and the intensity of the infrared light measured from the infrared sensor 320.

The processor 260 of an embodiment may process the image data 410, which is processed based on the AWB processing unit 440 and/or the WB adjusting unit 445, based on the bayer pattern converting unit 450. For example, the processor 260 may change the image data 410 displaying a color measured by the image sensor 230 according to a bayer pattern, wherein each of the plurality of pixels of the image data 410 includes a plurality of color components (for example, three components of red (R), green (G) and blue (B) and/or three components of Y, Cb and Cr) based on de-mosaic. For example, by interpolating a value of the image data 410 being based on the bayer pattern, the processor 260 may acquire the image data 410 being based on R, G and B.

In an embodiment of the disclosure, before the processor 260 processes the image data 410 based on the bayer pattern converting unit 450, the image data 410 may include a plurality of signals outputted from the plurality of photodiodes (PDs) included in the image sensor 230. The plurality of signals may be aligned within the image data 410 based on a specified pattern (for example, a bayer pattern) in which the plurality of photodiodes are arranged within the image sensor 230. After the processor 260 processes the image data 410 based on the bayer pattern converting unit 450, the image data 410 may indicate a color of each of the plurality of pixels based on a plurality of specified color components (for example, three components of red (R), green (G) and blue (B) and/or three components of Y, Cb and Cr).

The processor 260 of an embodiment may process the image data 410, which is processed based on the bayer pattern converting unit 450, based on the color converting unit 460. The processor 260 may adjust a color of the image data 410 according to a characteristic of the image sensor 230. For example, the processor 260 may adjust an inaccurately expressed color according to the characteristic of the image sensor 230.

The processor 260 of an embodiment may process the image data 410, which is processed based on the color converting unit 460, based on the gamma converting unit 470. The processor 260 may non-linearly adjust a color of the image data 410 according to a non-linear gamma characteristic (for example, a gamma characteristic of a display of the electronic device).

In various embodiments of the disclosure, the processor 260 may output the image data 410 applying various image processing schemes. For example, the processor 260 may output the image data 410 to a second processor (for example, the second processor 120, such as the AP of FIG. 3A) distinct from the processor 260 and/or a memory (for example, the memory 130 of FIG. 1). The image data 410 may be stored as at least a part of a photograph and/or video captured by the electronic device.

The processor 260 of the electronic device of various embodiments may compensate for lens shading and/or color shading included in the image data 410, based on an LSC algorithm of the LSC processing unit 420. The LSC algorithm may be performed based on a brightness identified using the AE processing unit 430, a color temperature identified using the AWB processing unit 440 and an intensity of infrared light identified using the infrared sensor 320. For example, the processor 260 may select any one of specified information corresponding to intensities of mutually different infrared light, based on the brightness, the color temperature and the intensity of the infrared light. The information may have a format of Table which includes coefficients (for example, a color gain of a red color) corresponding to respective mutually different pixels of the image data 410 and being multiplied by colors (for example, a red color) of the pixels. By adjusting colors of the plurality of pixels included in the image data 410 based on the selected information, the processor 260 may compensate for the lens shading and/or color shading included in the image data 410. An example of the specified information used by the processor 260 is described with reference to FIGS. 8A to 8B.

Figure 5A:
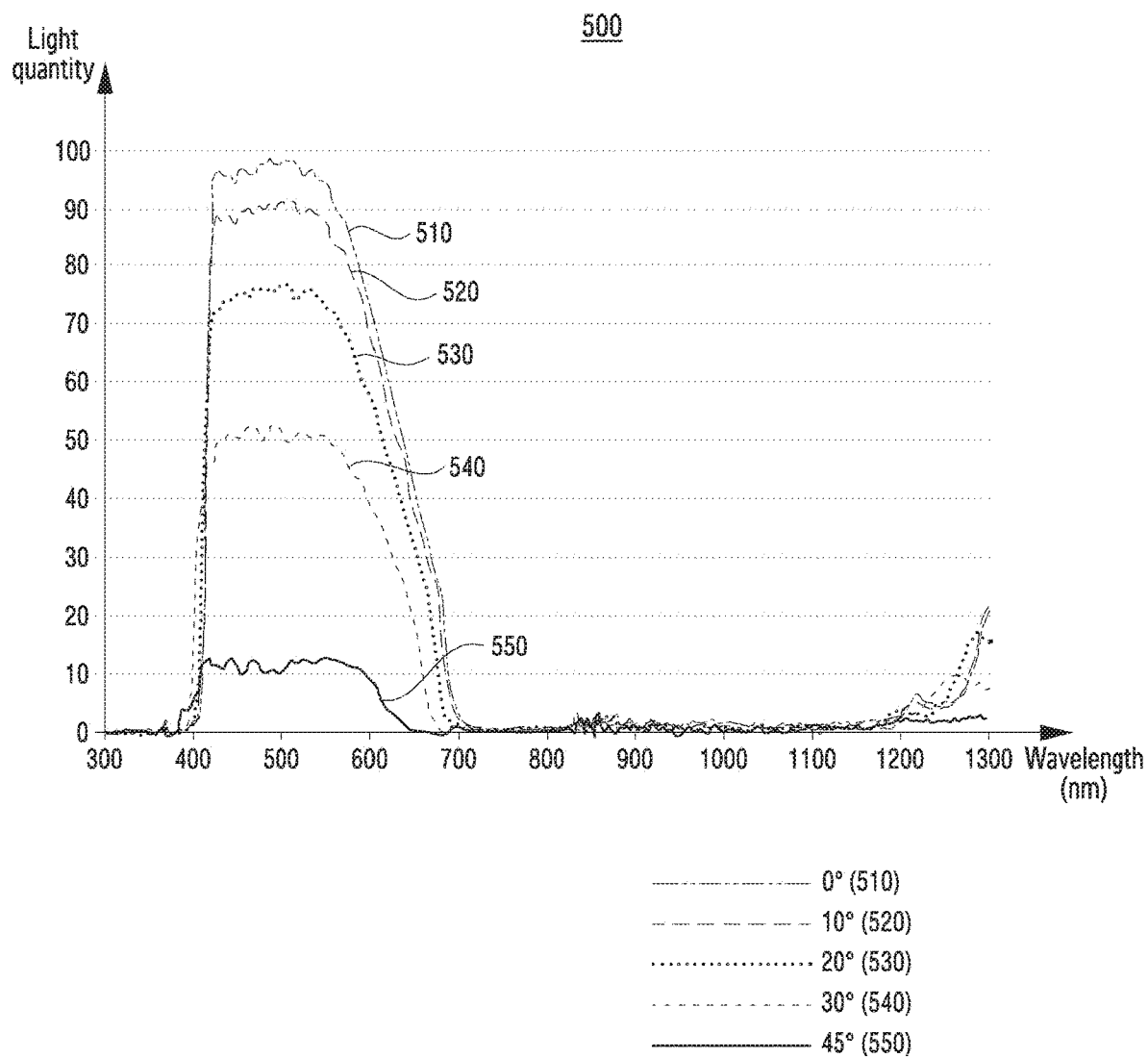
FIGS. 5A and 5B are diagrams illustrating lens shading provided by an image sensor of an electronic device according to various embodiments of the disclosure.
Figure 5B:
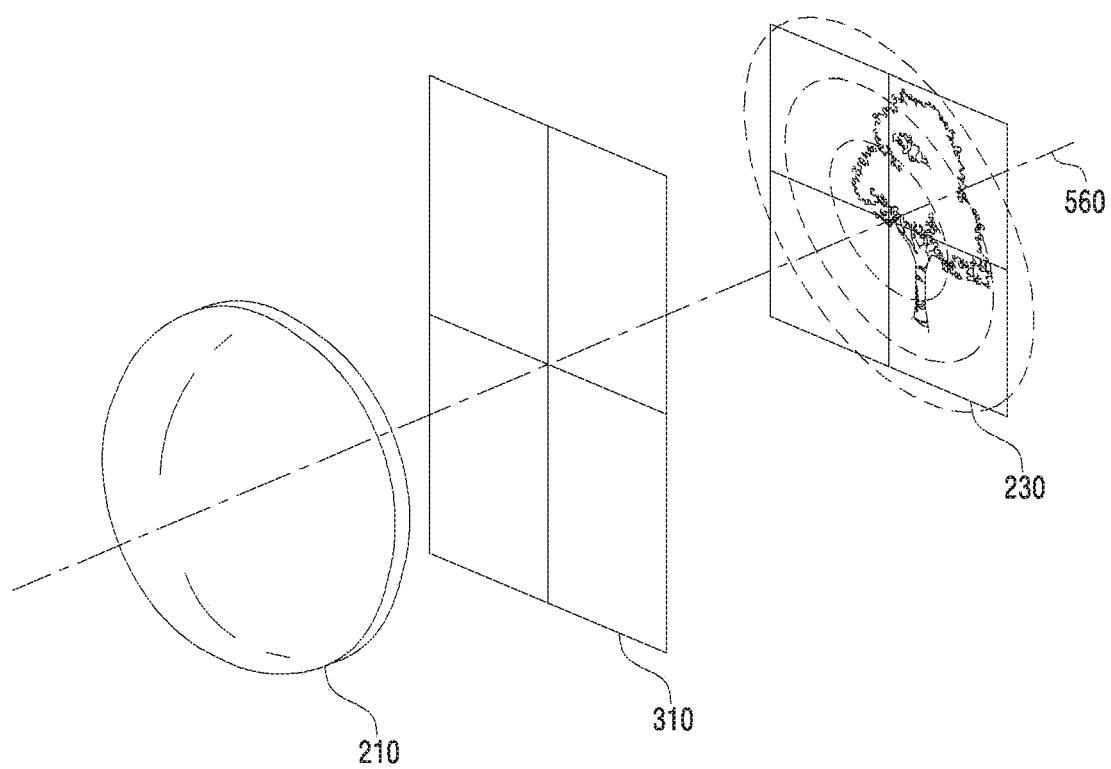

FIGS. 5A to 5B are diagrams illustrating lens shading provided by an image sensor of an electronic device according to various embodiments of the disclosure.

Referring to FIGS. 5A to 5B, the electronic device of FIGS. 5A to 5B may correspond to the electronic device 101 of FIG. 1 to FIG. 2 and FIG. 3A to FIG. 3B. The electronic device of various embodiments may identify an intensity of infrared light included in a light source by using an infrared sensor (for example, the infrared sensor 320 of FIGS. 3A to 3B), and compensate for the lens shading based on the identified intensity.

Referring to FIG. 5A, an example graph 500 illustrating a characteristic of an infrared filter (for example, the infrared filter 310 of FIG. 3A) included in the electronic device of various embodiments is illustrated. The lens shading means a distortion in which, according as the more an intensity of light passing through a lens of a camera is decreased the more it goes from a center part of the lens to a peripheral part thereof, a brightness of a portion of image data corresponding to the peripheral part of the lens becomes less than a brightness of another portion of the image data corresponding to the center part of the lens. The color shading means a distortion in which a color of the portion of the image data corresponding to the center part of the lens and a color of the portion of the image data corresponding to the peripheral part of the lens become different.

A transmission characteristic of the infrared filter may be different according to an angle of incidence of light arriving at the infrared filter. Referring to FIG. 5A, the graph 500 showing a light quantity of light passing through the infrared filter based on an angle of incidence and a wavelength is illustrated. A y axis refers to the light quantity of light passing through the infrared filter, and means that the larger a value is, the more light has passed through the infrared filter. Referring to FIG. 5A, a curve 510 indicates a light quantity for each wavelength when an angle of incidence is 0° (for example, when light vertically arrives at the infrared filter). External light passing through the lens at the center part of the lens may vertically arrive at the infrared filter. In this case, the infrared filter may filter the external light similarly with the curve 510.

In a comparison of curves 510, 520, 530, 540, and 550, the more an angle of incidence is increased, the more the infrared filter may block light of a shorter wavelength. The more the angle of incidence is increased, the more a wavelength of light blocked by the infrared filter may be decreased. The more it goes from the center part of the lens to the peripheral part thereof, the more the angle of incidence of light arriving at the infrared filter may be increased by a curved surface of the lens. A light quantity of external light passing through the lens at the peripheral part of the lens may be smaller than a light quantity of external light passing through the lens at the center part of the lens. Referring to the graph 500, the more it goes from the center part of the lens to the peripheral part thereof, the more the infrared filter may block light of a shorter wavelength (for example, light of a red wavelength band adjacent to an infrared wavelength band). A variation of the transmission characteristic of the infrared filter dependent on the angle of incidence may cause color shading.

Referring to FIG. 5B, the lens assembly 210, the infrared filter 310 and the image sensor 230 aligned along a specified axis 560 within a camera of the electronic device of various embodiments are illustrated. External light passing through the lens assembly 210 and the infrared filter 310 may arrive at the image sensor 230. The specified axis 560 may coincide with a center axis of the lens assembly 210.

The more it becomes distant from the specified axis 560 by lens shading, the more an intensity of light arriving at the image sensor 230 may be deceased. In the infrared filter 310, by the transmission characteristic, such as the graph 500, the more it becomes distant from the specified axis 560, the more light of a shorter wavelength (for example, light of a red wavelength band being adjacent to an infrared wavelength band and having a shorter wavelength than the infrared wavelength band) may be blocked. The more it becomes distant from the specified axis 560, the more light of red wavelength band is blocked by the infrared filter 310. Therefore, the more it becomes distant from the specified axis 560, the more a color of external light arriving at the image sensor 230 may be varied into a green wavelength band (color shading). The more an intensity of infrared light included in the external light and/or a component of the infrared wavelength band are increased, the more a color of external light arriving at a portion of the image sensor 230 corresponding to the peripheral part of the lens assembly 210 may be varied into a green wavelength.

By adjusting colors of a plurality of pixels included in image data received from the image sensor 230 based on an intensity of infrared light included in external light, the electronic device of various embodiments may compensate for the distortion of a color caused by the transmission characteristic of the infrared filter 310 and the infrared light included in the external light. Below, an operation in which the electronic device adjusts the color of the image data based on the intensity of the infrared light is described with reference to FIG. 6.

Figure 6:
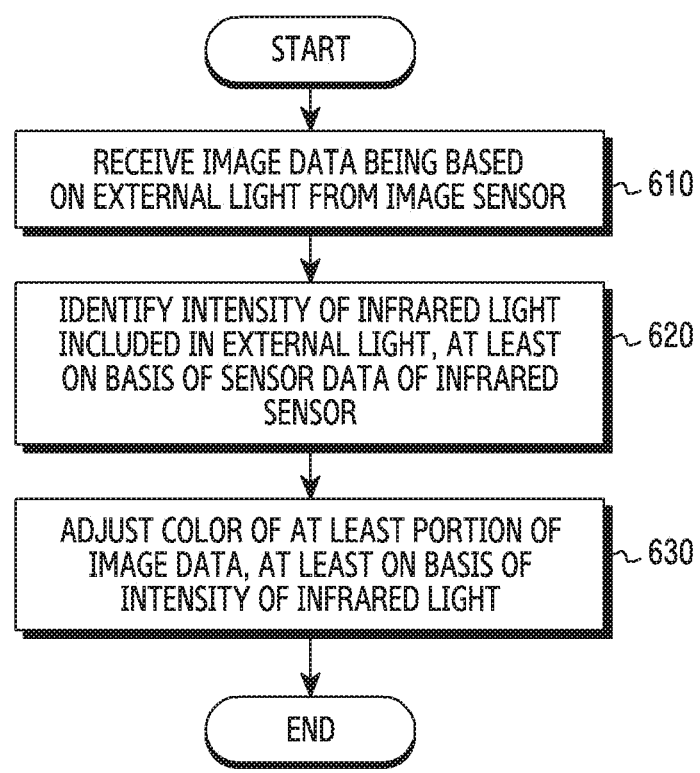
FIG. 6 is a flowchart illustrating an operation of an electronic device according to an embodiment of the disclosure.

FIG. 6 is a flowchart illustrating an operation of an electronic device according to an embodiment of the disclosure. The electronic device of FIG. 6 may correspond to the electronic device 101 of FIG. 1 to FIG. 2 and FIG. 3A to FIG. 3B. The operation of the electronic device of FIG. 6 may be performed by the ISP 260 of FIG. 2 and/or the processor 260 of FIG. 3A.

Referring to FIG. 6, in operation 610, the electronic device of various embodiments may receive image data being based on external light from an image sensor. That the electronic device receives the image data based on operation 610 may be carried out in response to a user input for activating a camera included in the electronic device (for example, a user input for executing a camera application). The image sensor may correspond to the image sensor 230 of FIG. 2 and FIG. 3A. The image data may correspond to the image data 410 of FIG. 4. For example, the image data received by the electronic device may be data arranging color values measured in a plurality of PDs, based on the arrangement of the plurality of PDs (for example, the arrangement of the plurality of PDs based on a bayer pattern) within the image sensor.

The image data received by the electronic device may be based on external light which passes through a lens (for example, the lens assembly 210 of FIG. 2 and FIG. 3A) included in a camera and an infrared filter (for example, the infrared filter 310 of FIG. 3A) and arrives at an image sensor. The external light may be distorted by the transmission characteristic of the infrared filter explained in FIGS. 5A to 5B. The distortion caused by the transmission characteristic of the infrared filter may, for example, be related to the color shading that is a phenomenon in which a color of a portion of image data corresponding to a peripheral part of a lens relatively distant away from a center axis of the lens is varied into a green wavelength band.

Referring to FIG. 6, in operation 620, the electronic device of various embodiments may identify an intensity of infrared light included in the external light, at least based on sensor data of the infrared sensor. The infrared sensor may, for example, correspond to the infrared sensor 320 of FIG. 3A to FIG. 3B. In an embodiment of the disclosure, the electronic device may acquire sensor data from the infrared sensor at a time point of receiving the image data based on operation 610. In an embodiment of the disclosure, the electronic device may identify a type of a light source related to the external light, based on the sensor data acquired from the infrared sensor. In an embodiment of the disclosure, the electronic device may identify color shading dependent on the intensity of the infrared light. The electronic device may identify a variation of the color of the portion of the image data corresponding to the peripheral part of the lens dependent on the intensity of the infrared light.

Referring to FIG. 6, in operation 630, the electronic device of various embodiments may adjust a color of at least a portion of the image data, at least based on the intensity of the infrared light. In an embodiment of the disclosure, in response to the identifying of the intensity of the infrared light based on operation 620, the electronic device may adjust the color of the at least portion of the image data. For example, to compensate the distortion (for example, color shading) of the image data caused by the lens and the infrared filter, the electronic device may adjust the color of the at least portion of the image data, based on the intensity of the infrared light. By applying a specified coefficient or gain to a color of each of a plurality of pixels included in the image data based on an LSC algorithm, the electronic device may adjust the color of each of the plurality of pixels.

In response to the receiving of the image data based on operation 610, the electronic device of an embodiment may identify a brightness of the external light related to the image data. The electronic device may use the identified brightness for adjustment of a brightness of the image data based on an AE algorithm. In an embodiment of the disclosure, the electronic device may adjust a color of at least a portion of the image data, based on the intensity of the infrared light identified based on operation 620 and the brightness of the external light.

In response to the receiving of the image data based on operation 610, the electronic device of an embodiment may identify a color temperature of the external light related to the image data. The electronic device may use the identified color temperature for adjustment of a color temperature of the image data based on an AWB algorithm. The electronic device may adjust the color of the at least portion of the image data, based on the intensity of the infrared light identified based on operation 620 and the color temperature of the external light.

In an embodiment of the disclosure, in response to the identifying of the intensity of the infrared light based on operation 620, the electronic device may adjust a color of at least a portion of the image data corresponding to another portion of a lens distinct from a portion including the center of the lens. The color adjusted by the electronic device may be a color (for example, red light) included in a wavelength band (for example, a red wavelength band) adjacent to an infrared wavelength band. For example, the more the intensity of the infrared light included in the external light is increased, the more the electronic device may emphasize red light of at least a portion of the image data corresponding to the peripheral part of the lens. For example, the more it becomes distant from a portion of the image data corresponding to the center part of the lens, and/or the more the intensity of the infrared light included in the external light is increased, the more a degree in which the electronic device emphasizes the red light may be increased. In an embodiment of the disclosure, by amplifying a value related to the red light within the image data, the electronic device may enhance the red light.

In another embodiment of the disclosure, by reducing an increment quantity of a value related to another color (for example, at least one of green light or blue light) except red light within the image data, the electronic device may emphasize the red light. For example, the more the intensity of the infrared light included in the external light is increased, the more the electronic device may reduce an increment quantity of at least one of green light or blue light of at least a portion of the image data corresponding to the peripheral part of the lens.

In response to the identifying of the intensity of the infrared light based on operation 620, the electronic device of various embodiments may acquire information which includes color gains corresponding to the respective mutually different pixels of the image data and corresponding to the intensity of the infrared light. Based on the acquired information, the electronic device may adjust colors of the plurality of pixels included in the image data. The information may be information for performing the LSC algorithm for compensating for the lens shading and/or the color shading.

Figure 7:
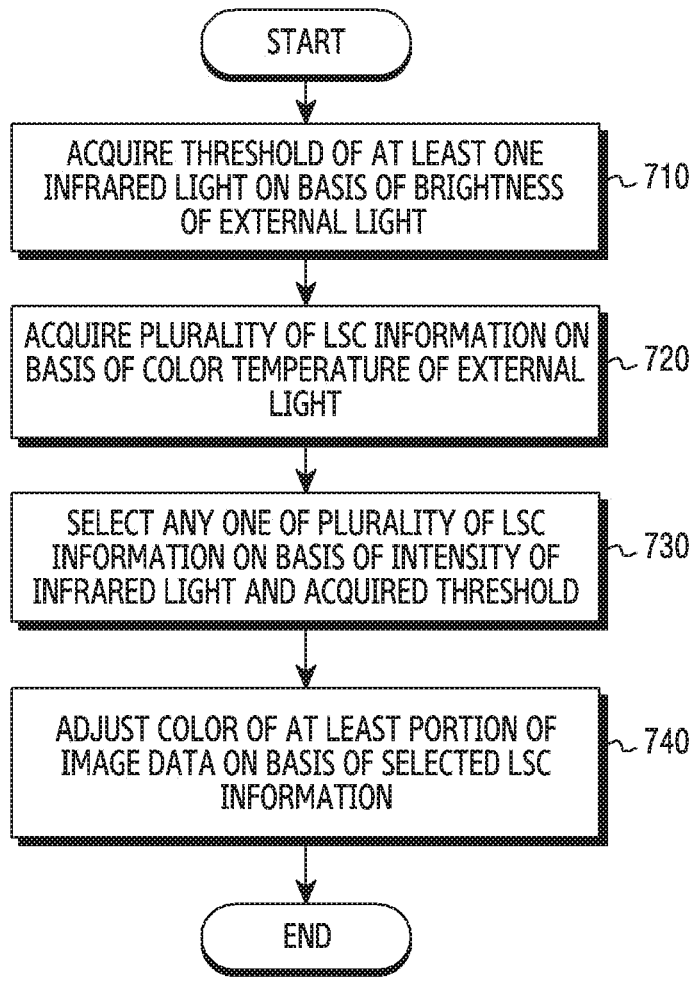
FIG. 7 is a flowchart illustrating an operation that an electronic device performs in order to adjust a color of image data according to an embodiment of the disclosure.

FIG. 7 is a flowchart illustrating an operation that an electronic device performs in order to adjust a color of image data according to an embodiment of the disclosure. The electronic device of FIG. 7 may correspond to the electronic device 101 of FIG. 1 to FIG. 2 and FIG. 3A to FIG. 3B. An operation of the electronic device of FIG. 7 may be performed by the ISP 260 of FIG. 2 and/or the processor 260 of FIG. 3A. The operation of FIG. 7 may be related to at least one of operations of FIG. 6, for example, operation 630 of FIG. 6. The operation of FIG. 7 may, for example, be at least partly related to the LSC processing unit 420 of FIG. 4 and/or the LSC algorithm.

Referring to FIG. 7, in operation 710, the electronic device of various embodiments may acquire a threshold of at least one infrared light based on a brightness of external light. In an embodiment of the disclosure, the electronic device may, for example, identify a brightness of external light related to image data based on the AE processing unit 430 of FIG. 4 and/or the AE algorithm. The brightness of the external light is a value representing the brightness of a plurality of pixels included in the image data, and may, for example, be at least one of an average value of the brightness of the plurality of pixels, a medium value, a maximum value or a minimum value. The threshold identified by the electronic device may be used for determining whether the infrared light is relatively more included in the external light. A relationship between the threshold acquired by the electronic device and the brightness is described with reference to FIG. 9A.

Referring to FIG. 7, in operation 720, the electronic device of various embodiments may acquire a plurality of LSC information, based on a color temperature of the external light. In an embodiment of the disclosure, the electronic device may, for example, identify the color temperature of the external light related to the image data based on the AWB processing unit 440 of FIG. 4 and/or the AWB algorithm. The LSC information is information used for compensating for lens shading and/or color shading, and may represent a lens shading correction coefficient and/or an LSC table. The LSC table may mean a data set including color gains which will be applied to respective mutually different pixels of the image data. The plurality of LSC information may correspond to intensities of mutually different infrared light, respectively. In an embodiment of the disclosure, the electronic device may acquire at least two LSC information among the plurality of LSC information, based on the color temperature of the external light. An example of the LSC information acquired by the electronic device is described with reference to FIGS. 8A to 8B.

Referring to FIG. 7, in operation 730, the electronic device of various embodiments may select any one of the plurality of LSC information, based on an intensity of the infrared light and the threshold acquired in operation 710. The intensity of the infrared light may, for example, be identified using the infrared sensor 320 of FIG. 3A. In response to acquiring the at least two LSC information among the plurality of LSC information based on the color temperature of the external light, the electronic device may select any one of the at least two LSC information based on the identified intensity of the infrared light. In an embodiment of the disclosure, based on at least one of first LSC information corresponding to a specified first intensity of the infrared light or second LSD information corresponding to a specified second intensity, the electronic device may identify at least one color gain corresponding to the identified intensity of the infrared light. The color gain may indicate a degree of emphasizing or enhancing at least one of red light, green light or blue light. An operation in which the electronic device selects the LSC information based on the intensity of the infrared light and the threshold is described with reference to FIG. 9B.

Referring to FIG. 7, in operation 740, the electronic device of various embodiments may adjust a color of at least a portion of the image data based on the selected LSC information. In an embodiment of the disclosure, based on at least one color gain included in the selected LSC information, the electronic device may adjust the color of the at least portion of the image data. In an embodiment of the disclosure, the color adjusted by the electronic device may be a color of red light included in the image data. The more it moves from a center part of the image data to a peripheral part thereof, and/or the more the intensity of the infrared light increases, the more a degree in which the electronic device adjusts (for example, adjusts to increase) the color of the red light may be increased. In an embodiment of the disclosure, the color adjusted by the electronic device may be a color of at least one of blue light or green light included in the image data. The more it moves from the center part of the image data to the peripheral part thereof, and/or the more the intensity of the infrared light increases, the more a degree in which the electronic device adjusts (for example, adjusts to decrease) a color of at least one of blue light or green light may be increased.

Figure 8B:
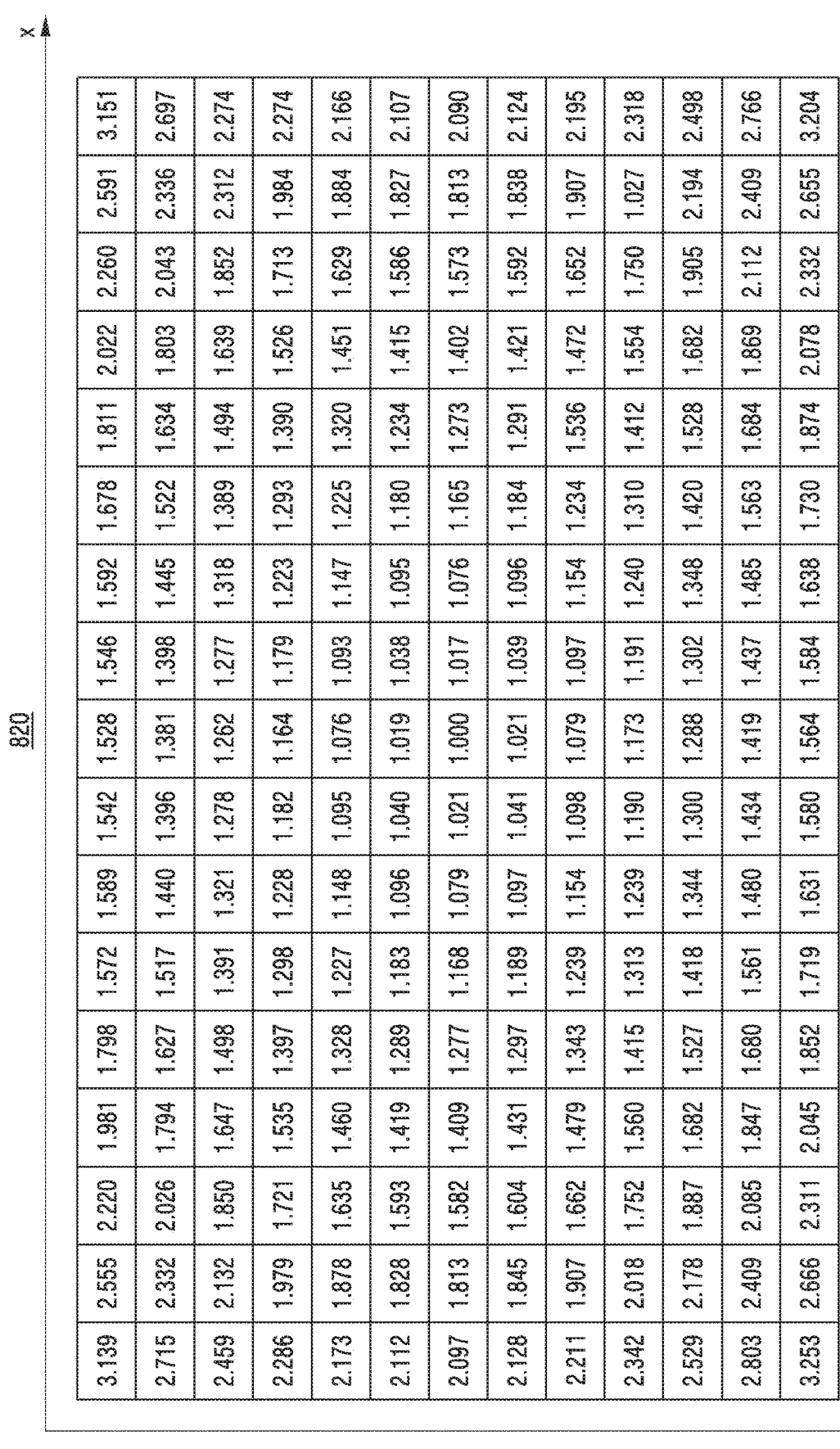

FIGS. 8A to 8B are diagrams illustrating LSC information used by an electronic device according to various embodiments of the disclosure. The electronic device of FIGS. 8A to 8B may correspond to the electronic device 101 of FIG. 1 to FIG. 2 and FIG. 3A to FIG. 3B. The LSC information of FIGS. 8A to 8B may be included in the LSC information of operations 720, 730, and 740 of FIG. 7.

The LSC information identified by the electronic device of various embodiments may include a plurality of color gains. The plurality of color gains included in the LSC information may be used to adjust colors of pixels of mutually different positions in image data. Referring to FIGS. 8A to 8B, specified first LSC information 810 and specified second LSC information 820 are illustrated in the form of Table. For example, the LSC information may include (17×13) color gains. The color gain may represent a degree of emphasizing or enhancing the color of the pixel of the image data. The electronic device may, for example, multiply a color value of the image data being based on a bayer pattern by the color gain, to adjust the color of the image data. The color gain corresponding to each of the plurality of pixels of the image data may be determined by interpolating the color gains included in the LSC information.

A position of a color gain within Table may indicate a position of a pixel within image data to which the color gain is applied. For example, a color gain (1.000) of a center part (row 9 and column 7) of Table may be applied to a center part of the image data. In an embodiment of the disclosure, the more it moves from the center part of the image data to the peripheral part thereof, the more a degree in which electronic device adjusts the color of the image data based on the LSC information may be increased. Referring to FIG. 8A, the more it moves from the center part of Table to a peripheral part thereof, the more the color gain may be increased.

The electronic device of various embodiments may select LSC information emphasizing red light of image data according as an intensity of infrared light included in external light is large, among the plurality of LSC information including the first LSC information 810 and the second LSC information 820. If comparing a gain (for example, a gain (2.957) of row 1 and column 1) of a peripheral part of the first LSC information 810 and a gain (for example, a gain (3.139) of row 1 and column 1) of a peripheral part of the second LSC information 820, the gain of the peripheral part of the second LSC information 829 may be larger. In response to the intensity of the infrared light included in the external light exceeding a specified threshold, the electronic device may select the second LSC information 820 including a relatively great color gain among the first LSC information 810 and the second LSC information 820. The plurality of color gains included in the selected second LSC information 820 may be used to adjust colors of mutually different pixels in the image data.

The electronic device of an embodiment may select LSC information reducing an increment quantity of at least one of blue light or green light of the image data according as the intensity of the infrared light included in the external light is large, among the plurality of LSC information including the first LSC information 810 and the second LSC information 820. As the increment quantity of blue light or green light is reduced, red light may be relatively emphasized. For example, in response to the intensity of the infrared light included in the external light exceeding a specified threshold, the electronic device may adjust at least one of blue light or green light of the image data, based on the first LSC information 810 including a relatively small color gain.

Figure 9B:
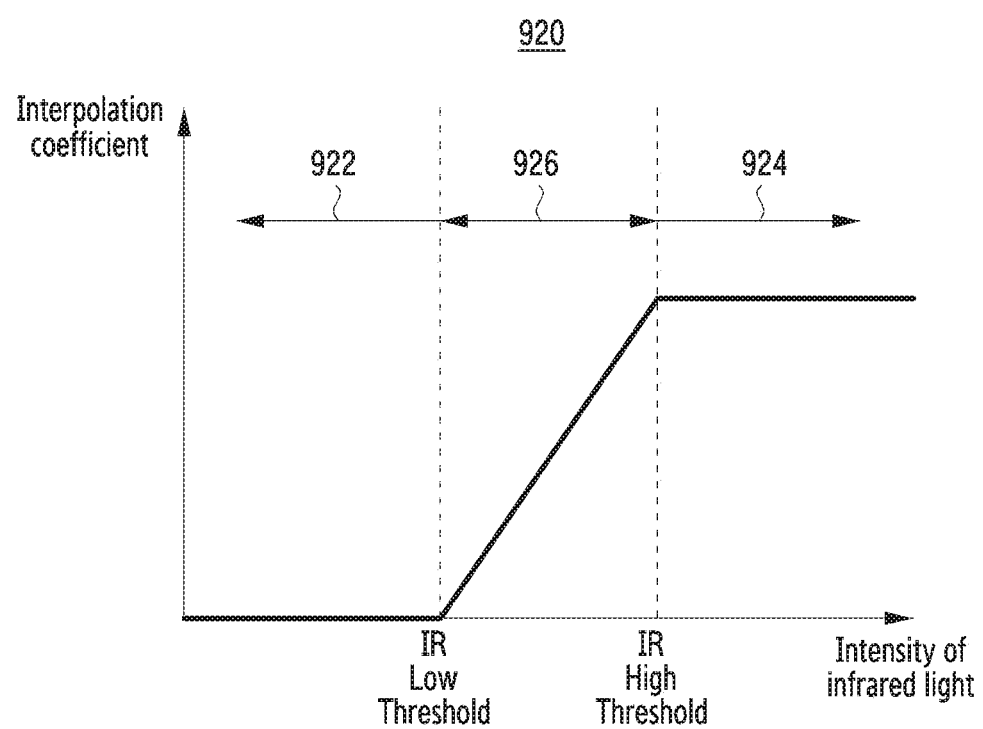

FIGS. 9A and 9B are diagrams illustrating an operation in which an electronic device selects LSC information based on a brightness of external light according to various embodiments of the disclosure. The electronic device of FIG. 9A to FIG. 9B may correspond to the electronic device 101 of FIG. 1 to FIG. 2 and FIG. 3A to FIG. 3B.

Referring to FIG. 9A, an example of a look-up table (LUT) 910 that the electronic device uses to determine a threshold for comparing with an intensity of infrared light is illustrated. In an embodiment of the disclosure, the electronic device may use the look-up table 910 in order to acquire the threshold of operation 710 of FIG. 7. The look-up table 910 may be Table indicating a relationship between a brightness value (BV) indicating the brightness of the external light, and the threshold. The brightness of the external light may, for example, be identified based on the AE processing unit 430 of FIG. 4 and/or the AE algorithm. The brightness value may be based on a base-2 log scale.

A light quantity of infrared light included in a light source may be varied according to a brightness of the light source. The electronic device of an embodiment may identify at least one threshold for determining whether relatively more infrared light has been included in external light, based on a brightness of the external light. For example, in response to identifying a brightness value of −2, the electronic device may determine a degree in which the infrared light is included in the external light, based on thresholds (60, 100). For example, in response to identifying a brightness value of 0, the electronic device may determine a degree in which the infrared light is included in the external light, based on thresholds (300, 450). In response to identifying a brightness value not included in the look-up table 910, the electronic device may identify at least one threshold, by interpolating thresholds included in the look-up table 910 according to a brightness value included in the look-up table 910.

Referring to FIG. 9B, it is a graph 920 illustrating an operation of acquiring LSC information for adjusting a color of image data based on a threshold the electronic device identifies from the look-up table 910. An x axis of the graph 920 may indicate an intensity of infrared light identified from an infrared sensor. The thresholds (i.e., IR low threshold and IR high threshold) of the graph 920 may be identified based on a brightness of external light and the look-up table 910 of FIG. 9A.

For example, in a state of identifying the brightness value of −2, each of the thresholds of the graph 920 may be 60, 100. In a state of identifying the brightness value of −2, in response to the intensity of the infrared light identified from the infrared sensor being included within a duration 922 less than 60, the electronic device may determine that relatively less infrared light is included in external light. In a state of identifying the brightness value of −2, in response to the intensity of the infrared light identified from the infrared sensor being included within a duration 924 exceeding 100, the electronic device may determine that relatively more infrared light is included in the external light.

For example, in a state of identifying a brightness value of 3, each of thresholds of the graph 920 may be (1200, 1400). In a state of identifying the brightness value of 3, in response to an intensity of infrared light identified from the infrared sensor being included within the duration 922 less than 1200, the electronic device may determine that relatively less infrared light is included in the external light. In a state of identifying the brightness value of 3, in response to the intensity of the infrared light identified from the infrared sensor being included within the duration 924 exceeding 1400, the electronic device may determine that relatively more infrared light is included in the external light.

For example, in response to the electronic device identifying LSC information which will be applied to image data based on the first LSC information 810 and the second LSC information 820 of FIGS. 8A and 8B, the electronic device may select the first LSC information 810 in response to identifying the intensity of the infrared light included in the duration 922, and select the second LSC information 820 in response to identifying the intensity of the infrared light included in the duration 924. Because a color gain of the second LSC information 820 is a relatively high value, the electronic device may select the second LSC information 820 in the duration 924 corresponding to an intensity of relatively more infrared light.

A duration 926 between the durations 922 and 924 is a duration identifying LSC information based on interpolation. In response to identifying an intensity of infrared light included in the duration 926, the electronic device may acquire LSC information which will be applied to image data, by interpolating the first LSC information 810 and the second LSC information 820 (for example, based on a linear interpolation coefficient of FIG. 9B).

LSC information corresponding to at least one of the durations 922, 924 and 926 may be selected among previously stored specified LSC information. In an embodiment of the disclosure, the electronic device may select the LSC information corresponding to the at least one of the durations 922, 924, and 926 based on a color temperature of external light.

FIG. 10 is a diagram illustrating an operation in which an electronic device selects LSC information based on a color temperature of external light according to an embodiment of the disclosure. The electronic device of FIG. 10 may correspond to the electronic device 101 of FIG. 1 to FIG. 2 and FIG. 3A to FIG. 3B.

According to various embodiments of the disclosure, the electronic device may select any one LSC information among a plurality of LSC information (for example, LSC table 1 to LSC table 4) mutually different depending on an intensity of infrared light, based on a brightness of external light, a color temperature and the intensity of the infrared light. Table 1000 of FIG. 10 illustrates a type of an LSC table the electronic device selects based on the brightness of the external light, the color temperature and the intensity of the infrared light. Each of the LSC table 1 to the LSC table 4 may correspond to each of a specified first intensity to a specified fourth intensity of the infrared light. The more it goes from the first intensity to the fourth intensity, the more the intensity of the infrared light may be increased. The LSC table 1 to the LSC table 4 may include a plurality of color gains corresponding to mutually different positions of image data as in FIG. 8A to FIG. 8B.

Referring to FIG. 10, based on a brightness of external light, the electronic device may determine whether image data has been photographed indoors or has been photographed outdoors. For example, in response to identifying external light of a specified threshold or more, the electronic device may determine that the image data is photographed outdoors. In an embodiment of the disclosure, the electronic device may determine whether the image data has been photographed indoors or has been photographed outdoors, based on a Global Positioning System (GPS) sensor and/or a user input.

In response to it being determined that the image data has been photographed outdoors, the electronic device of various embodiments may select any one of specified LSC tables (for example, the LSC table 2 and the LSC table 4) irrespective of a color temperature of external light. For example, in response to an intensity of infrared light being equal to or being greater than a specified threshold, the electronic device may adjust a color of the image data based on the LSC table 4. For example, in response to the intensity of the infrared light being less than the specified threshold, the electronic device may adjust the color of the image data based on the LSC table 2. The threshold may, for example, be determined based on the look-up table 910 of FIG. 9A.

In response to the image data being photographed indoors, the electronic device of various embodiments may select at least two of the specified LSC tables based on a color temperature of external light. The selecting of any one of the selected LSC tables may be based on an intensity of infrared light measured from an infrared sensor. For example, in response to the image data having been photographed indoors, and the color temperature being 4000K or more, the electronic device may select any one of the LSC table 1 or the LSC table 3. For example, in response to the image data having been photographed indoors, and the color temperature being 3000K or less, the electronic device may select any one of the LSC table 2 or the LSC table 3.

That the electronic device selects any one of the LSC tables may be based on a result of comparing an intensity of infrared light and a threshold determined based on a brightness of external light. For example, in response to the image data having been photographed indoors, and a brightness value of the external light being −2, the electronic device may compare the intensity of the infrared light with the thresholds (60, 100) based on the look-up table 910 of FIG. 9A. In response to the color temperature being 3000K or less, and the intensity of the infrared light being less than 60, the electronic device may select the LSC table 2 based on Table 1000, to perform LSC. In response to the color temperature being 3000K or less, and the intensity of the infrared light exceeding 100, the electronic device may select the LSC table 3, to perform LSC. In response to the color temperature being 3000K or less, and the intensity of infrared light being equal to or being greater than 60 and being less than 100, the electronic device may identify an LSC table which will be applied to image data, by interpolating the LSC table 2 and the LSC table 3.

For another example, in response to the image data having been photographed indoors, and the brightness value of the external light being 3, the electronic device may compare the intensity of the infrared light with the thresholds (1200, 1400), based on the look-up table 910 of FIG. 9A. In response to the color temperature being equal to or being greater than 3000K or being less than 4000K, and the intensity of the infrared light exceeding 1400, the electronic device may select the LSC table 3, to compensate for color shading. In response to the color temperature being equal to or being greater than 3000K or being less than 4000K, and the intensity of the infrared light being less than 1200, the electronic device may select the LSC table 1, to compensate for color shading. In response to the color temperature being equal to or being greater than 3000K and being less than 4000K, and the intensity of the infrared light being equal to or being greater than 1200 and being less than 1400, the electronic device may determine an LSC table for compensating for color shading by interpolating the LSC table 1 and the LSC table 3.

By comparing thresholds being based on not only a color temperature of external light but also an intensity of infrared light and a brightness of the external light, the electronic device of various embodiments may perform the selecting of any one of a plurality of LSC tables. By doing so, the electronic device may compensate for color shading based on an actual intensity of the infrared light included in the external light. For example, in a room at which solar light arrives, a color temperature identified based on the AWB algorithm may exceed 5000K. When not considering the intensity of the infrared light, the compensating of the color shading may be performed based on an indoor light source (for example, a fluorescent lamp and/or a LED light source) exceeding 5000K. In this case, by the infrared light included in solar light, a center part of image data may be expressed relatively in a red color, and a peripheral part thereof may be expressed relatively in a green color. In this case, by performing the compensating of the color shading considering the intensity of the infrared light based on an infrared sensor, the electronic device of various embodiments may relatively more emphasize red light of the peripheral part of the image data or relatively more weaken blue light or green light of the peripheral part.

Figure 11:
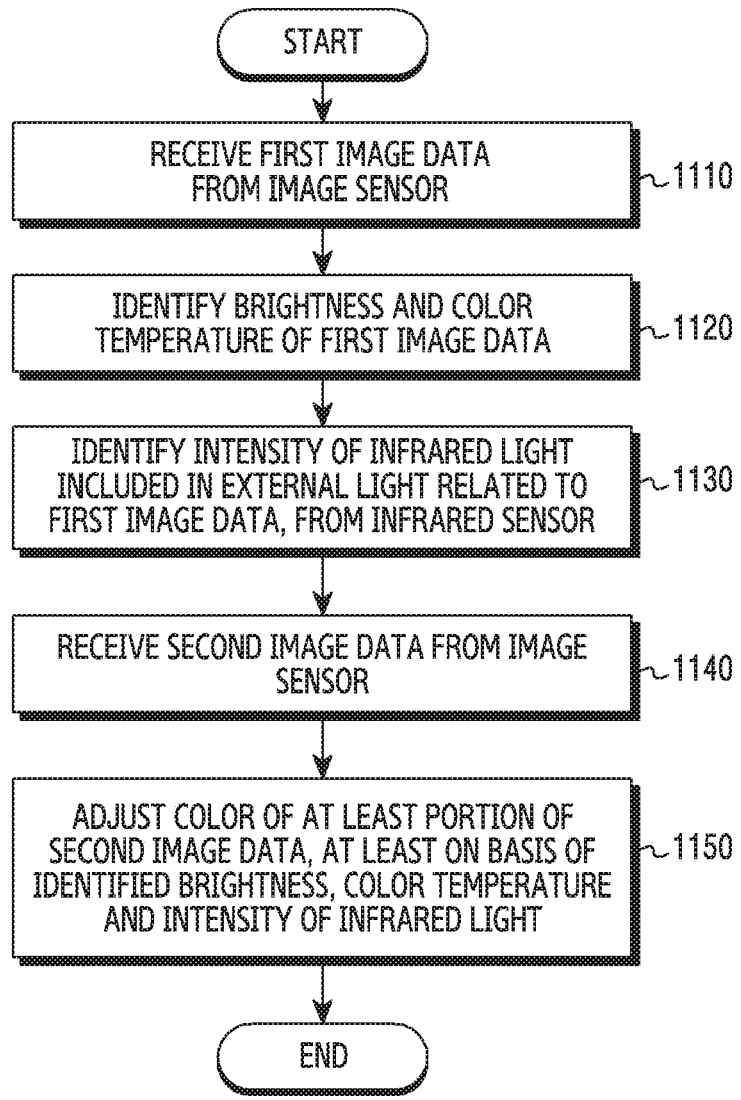
FIG. 11 is a flowchart illustrating an operation of an electronic device according to an embodiment of the disclosure.

FIG. 11 is a flowchart illustrating an operation of an electronic device according to an embodiment of the disclosure. The electronic device of FIG. 11 may correspond to the electronic device 101 of FIG. 1 to FIG. 2 and FIG. 3A to FIG. 3B. An operation of the electronic device of FIG. 11 may be performed by the ISP 260 of FIG. 2 and/or the processor 260 of FIG. 3A.

Referring to FIG. 11, in operation 1110, the electronic device of various embodiments may receive first image data from an image sensor. The first image data may be arrayed according to a pattern (for example, a bayer pattern) in which a plurality of PDs are arranged in the image sensor, and may include color values measured in the respective plurality of PDs included in the image sensor.

Referring to FIG. 11, in operation 1120, the electronic device of various embodiments may identify a brightness of the first image data and a color temperature thereof. The brightness of the first image data may, for example, be identified based on the AE processing unit 430 of FIG. 4 and/or the AE algorithm. The brightness of the first image data may mean a brightness of external light related to the first image data. The color temperature of the first image data may, for example, be identified based on the AWB processing unit 440 of FIG. 4 and/or the AWB algorithm. The brightness of the first image data may mean a color temperature of the external light related to the first image data.

In an embodiment of the disclosure, in response to the identifying of a brightness of another image data received from the image sensor prior to the first image data, the electronic device may adjust the brightness of the first image data. In an embodiment of the disclosure, in response to the identifying of a color temperature of another image data received from the image sensor prior to the first image data, the electronic device may adjust a white balance of the first image data. In an embodiment of the disclosure, the compensating of color shading included in the first image data may be performed, based on the brightness of the other image data, the color temperature and an intensity of infrared light included in external light related to the other image data.

Referring to FIG. 11, in operation 1130, the electronic device of various embodiments may identify an intensity of infrared light included in external light related to the first image data, from the infrared sensor. The brightness and color temperature identified in operation 1120 and the intensity of the infrared light identified in operation 1130 may be used to compensate for color shading of the other image data received subsequent to the first image data.

Referring to FIG. 11, in operation 1140, the electronic device of various embodiments may receive second image data from the image sensor. For example, after the receiving of the first image data, the electronic device may receive the second image data from the image sensor. In response to the receiving of the second image data, in operation 1150, the electronic device of various embodiments may adjust a color of at least a portion of the second image data, based on at least one of the identified brightness, color temperature and intensity of the infrared light. In an embodiment of the disclosure, based on the brightness and color temperature of the first image data identified in operation 1120 and the intensity of the infrared light included in the external light related to the first image data identified in operation 1130, the electronic device may adjust a color of at least a portion of the second image data.

That the electronic device adjusts the color of the at least portion of the second image data may be performed in order to compensate for color shading of the second image data. An operation that the electronic device performs in order to compensate for the color shading of the second image data may be based on various embodiments described in FIGS. 9A to 9B and FIG. 10. According to an embodiment of FIG. 11, in response to the image sensor sequentially outputting the first image data and the second image data according to time, the electronic device may compensate for lens shading and/or color shading of the second image data subsequent to the first image data, based on the brightness related to the first image data, the color temperature and the intensity of the infrared light.

The electronic device of various embodiments may use an infrared sensor included in the electronic device, in order to compensate for lens shading and/or color shading being included in image data and being dependent on a structure of a lens and an infrared filter. The electronic device may determine a degree of adjusting a color of image data, based on an intensity of infrared light included in external light measured using the infrared sensor.

An electronic device of various embodiments may include a lens, an infrared filter, an image sensor, an infrared sensor and a processor operably coupled to the image sensor and the infrared sensor. The processor may receive image data that is based on external light passing through the lens and the infrared filter and arriving at the image sensor, from the image sensor, and identify an intensity of infrared light included in the external light, at least based on sensor data of the infrared sensor, and in response to the identifying of the intensity of the infrared light, adjust a color of at least portion of the image data at least based on the intensity of the infrared light.

In an embodiment of the disclosure, the processor may adjust the color of the at least portion of the image data based on the intensity of the infrared light, in order to compensate for the distortion of the image data caused by the lens and the infrared filter.

In an embodiment of the disclosure, the processor may, in response to the identifying of the intensity of the infrared light, acquire information which includes color gains corresponding to respective mutually different pixels of the image data and corresponding to the intensity of the infrared light, and based on the acquired information, adjust colors of a plurality of pixels included in the image data.

In an embodiment of the disclosure, the processor may acquire information which includes the color gains related to red light based on the intensity of the infrared light.

In an embodiment of the disclosure, the processor may, in response to the receiving of the image data, identify a brightness and color temperature of the external light related to the image data, and adjust the color of the at least portion of the image data based on the brightness, the color temperature and the intensity of the infrared light.

In an embodiment of the disclosure, the processor may receive the image data in which a plurality of signals outputted from a plurality of photodiodes within the image sensor are aligned based on a specified pattern of the plurality of photodiodes, from the image sensor, and after adjusting the color of the at least portion of the image data at least based on the intensity of the infrared light, change the image data that is based on the specified pattern, wherein the image data indicates a color of each of a plurality of pixels based on a plurality of specified color components.

In an embodiment of the disclosure, the processor may, in response to the identifying of the intensity of the infrared light, adjust a color of at least portion of the image data corresponding to another portion of the lens distinct from a portion including a center of the lens.

In an embodiment of the disclosure, the processor may identify at least one color gain corresponding to the identified intensity of the infrared light, based on at least one of first information corresponding to a specified first intensity of the infrared light or second information corresponding to a specified second intensity, and adjust the color of the at least portion of the image data based on the at least one color gain.

A method of the electronic device of various embodiments may include receiving image data that is based on external light passing through a lens and infrared filter of the electronic device and arriving at an image sensor of the electronic device, from the image sensor, and identifying an intensity of infrared light included in the external light, at least based on sensor data of the infrared sensor of the electronic device, and in response to the identifying of the intensity of the infrared light, adjusting a color of at least portion of the image data at least based on the intensity of the infrared light.

According to an embodiment of the disclosure, the adjusting may include adjusting the color of the at least portion of the image data based on the intensity of the infrared light, in order to compensate for the distortion of the image data caused by the lens and the infrared filter.

According to an embodiment of the disclosure, the adjusting may include, in response to the identifying of the intensity of the infrared light, acquiring information which includes color gains corresponding to respective mutually different pixels of the image data and corresponding to the intensity of the infrared light, and based on the acquired information, adjusting colors of a plurality of pixels included in the image data.

According to an embodiment of the disclosure, the method may further include, in response to the receiving of the image data, identifying a brightness and color temperature of the external light related to the image data, and the adjusting may include adjusting the color of the at least portion of the image data based on the brightness, the color temperature and the intensity of the infrared light.

According to an embodiment of the disclosure, the receiving may include receiving the image data in which a plurality of signals outputted from a plurality of photodiodes within the image sensor are aligned based on a specified pattern of the plurality of photodiodes, from the image sensor, and may further include, after adjusting the color of the at least portion of the image data at least based on the intensity of the infrared light, changing the image data that is based on the specified pattern, wherein the image data indicates a color of each of a plurality of pixels based on a plurality of specified color components.

According to an embodiment of the disclosure, the adjusting may include, in response to the identifying of the intensity of the infrared light, adjusting a color of at least portion of the image data corresponding to another portion of the lens distinct from a portion including a center of the lens.

According to an embodiment of the disclosure, the adjusting may include identifying at least one color gain corresponding to the identified intensity of the infrared light, based on at least one of first information corresponding to a specified first intensity of the infrared light or second information corresponding to a specified second intensity, and adjusting the color of the at least portion of the image data based on the at least one color gain.

An electronic device of various embodiments may include an image sensor, an infrared sensor and a processor operably coupled to the image sensor and the infrared sensor. The processor may receive first image data from the image sensor, and in response to the receiving of the first image data, identify a brightness and color temperature of the first image data, and identify an intensity of infrared light included in external light related to the first image data, from the infrared sensor, and adjust a color of at least portion of second image data received from the image sensor after the receiving of the first image data, based on at least one of the identified brightness, color temperature, and intensity of the infrared light.

According to an embodiment of the disclosure, the processor may adjust the color of the at least portion of the second image data based on the intensity of the infrared light, in order to compensate for the distortion of the second image data caused by a lens and an infrared filter through which external light arriving at the image sensor passes.

According to an embodiment of the disclosure, the processor may, in response to the identifying of the intensity of the infrared light, acquire information which includes color gains corresponding to respective mutually different pixels of the second image data, and based on the acquired information, adjust colors of a plurality of pixels included in the second image data.

According to an embodiment of the disclosure, the processor may select information corresponding to the brightness, the color temperature and the intensity of the infrared light, among a plurality of specified information including the color gains, and based on the selected information, adjust colors of the plurality of pixels included in the second image data.

According to an embodiment of the disclosure, the processor may adjust a color of at least portion of the second image data corresponding to another portion of the lens distinct from a portion including a center of the lens related to the image sensor, based on the selected information.

Methods of embodiments mentioned in claims of the disclosure or the specification thereof may be implemented in the form of hardware, software, or a combination of hardware and software.

In response to being implemented by the software, a computer-readable storage media storing one or more programs (i.e., software modules) may be provided. The one or more programs stored in the computer-readable storage media are configured for execution by one or more processors of an electronic device. The one or more programs include instructions for enabling the electronic device to execute methods of embodiments mentioned in claims of the disclosure or the specification thereof.

These programs (i.e., software modules and/or software) may be stored in a random access memory (RAM), a non-volatile memory including a flash memory, a read only memory (ROM), an electrically erasable programmable ROM (EEPROM), a magnetic disc storage device, a compact disc—ROM (CD-ROM), digital versatile discs (DVDs), an optical storage device of another form, and/or a magnetic cassette. Or, the program may be stored in a memory that is configured in combination of some of them or all. In addition, each configured memory may be included in plural as well.

In addition, the program may be stored in an attachable storage device that may access through a communication network, such as the Internet, an intranet, a local area network (LAN), a wireless LAN (WLAN) or a storage area network (SAN), or a communication network configured in combination of them. This storage device may access a device performing an embodiment of the disclosure through an external port. In addition, a separate storage device on the communication network may access the device performing the embodiment of the disclosure as well.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:
1. An electronic device comprising:
a lens;
an infrared filter;
an image sensor;
an infrared sensor; and
at least one processor operably coupled to the image sensor and the infrared sensor,
wherein the at least one processor is configured to:
receive image data that is based on external light passing through the lens and the infrared filter and arriving at the image sensor, from the image sensor,
identify an intensity of infrared light comprised in the external light, at least based on sensor data of the infrared sensor, and
in response to the identifying of the intensity of the infrared light, adjust a color of at least portion of the image data at least based on the intensity of the infrared light and based on an application of a gain to a color of each of a plurality of pixels included in the image data, wherein the gain corresponds to a degree of enhancing the color of the pixels of the image data, and is determined by an interpolation of color gains included in a lens shading correction information, wherein the adjusting the color of the at least portion of the image data comprises:

identifying whether the intensity of the infrared light comprised in the external light exceeds threshold, and in response to identifying that the intensity of the infrared light exceeds the threshold, applying the gain to the color of each of the pixels to enhance red light compared to green light or blue light of the image data, wherein the threshold is determined based on a brightness of the external light, and wherein the threshold is determined so that the threshold has a larger value as the brightness of external light increases.

2. The electronic device of claim 1, wherein, the at least one processor is further configured to:

adjust the color of the at least portion of the image data based on the intensity of the infrared light, and compensate for distortion of the image data caused by the lens and the infrared filter.

3. The electronic device of claim 1, wherein the at least one processor is further configured to:

in response to the identifying of the intensity of the infrared light, acquire information which comprises the color gains corresponding to respective mutually different pixels of the image data and corresponding to the intensity of the infrared light, and based on the acquired information, adjust colors of the plurality of pixels comprised in the image data.

4. The electronic device of claim 3, wherein the at least one processor is further configured to acquire information which comprises the color gains related to red light based on the intensity of the infrared light.

5. The electronic device of claim 1, wherein the at least one processor is further configured to:

in response to the receiving of the image data, identify a brightness and color temperature of the external light related to the image data, and adjust the color of the at least portion of the image data based on the brightness, the color temperature and the intensity of the infrared light.

6. The electronic device of claim 1, wherein the at least one processor is further configured to:

receive the image data in which a plurality of signals outputted from a plurality of photodiodes within the image sensor are aligned based on a specified pattern of the plurality of photodiodes, from the image sensor, and after adjusting the color of the at least portion of the image data at least based on the intensity of the infrared light, change the image data that is based on the specified pattern, wherein the image data indicates a color of each of the plurality of pixels based on a plurality of specified color components.

7. The electronic device of claim 1, wherein, in response to the identifying of the intensity of the infrared light, the at least one processor is further configured to adjust a color of at least a portion of the image data corresponding to another portion of the lens distinct from a portion comprising a center of the lens.

8. The electronic device of claim 1, wherein the at least one processor is further configured to:

identify at least one color gain corresponding to the identified intensity of the infrared light, based on at least one of first information corresponding to a specified first intensity of the infrared light or second information corresponding to a specified second intensity, and adjust the color of the at least portion of the image data based on the at least one color gain.

9. A method of an electronic device, the method comprising:

receiving image data that is based on external light passing through a lens and infrared filter of the electronic device and arriving at an image sensor of the electronic device, from the image sensor;

identifying an intensity of infrared light comprised in the external light, at least based on sensor data of an infrared sensor of the electronic device; and in response to the identifying of the intensity of the infrared light, adjusting a color of at least portion of the image data at least based on the intensity of the infrared light and based on application of a gain to a color of each of a plurality of pixels included in the image data, wherein the gain corresponds to a degree of enhancing the color of the pixels of the image data, and is determined by an interpolation of color gains included in a lens shading correction information, wherein the adjusting the color of the at least portion of the image data comprises:

identifying whether the intensity of the infrared light comprised in the external light exceeds threshold, and in response to identifying that the intensity of the infrared light exceeds the threshold, applying the gain to the color of each of the pixels to enhance red light compared to green light or blue light of the image data, wherein the threshold is determined based on a brightness of the external light, and wherein the threshold is determined so that the threshold has a larger value as the brightness of external light increases.

10. The method of claim 9, wherein, the adjusting of the color of the at least the portion of the image data comprises adjusting the color of the at least portion of the image data based on the intensity of the infrared light, and compensating for distortion of the image data caused by the lens and the infrared filter.

11. The method of claim 9, wherein the adjusting of the color of the at least the portion of the image data comprises:

in response to the identifying of the intensity of the infrared light, acquiring information which comprises the color gains corresponding to respective mutually different pixels of the image data and corresponding to the intensity of the infrared light; and based on the acquired information, adjusting colors of the plurality of pixels comprised in the image data.

12. The method of claim 9, further comprising, in response to the receiving of the image data, identifying a brightness and color temperature of the external light related to the image data, and wherein the adjusting comprises adjusting the color of the at least portion of the image data based on the brightness, the color temperature and the intensity of the infrared light.

13. The method of claim 9, wherein the receiving of the image data comprises receiving the image data in which a plurality of signals outputted from a plurality of photodiodes within the image sensor are aligned based on a specified pattern of the plurality of photodiodes, from the image sensor, and further comprising, after adjusting the color of the at least portion of the image data at least based on the intensity of the infrared light, changing the image data that is based on the specified pattern, wherein the image data indicates a color of each of the plurality of pixels based on a plurality of specified color components.

14. The method of claim 9, wherein the adjusting of the color of the at least the portion of the image data comprises, in response to the identifying of the intensity of the infrared light, adjusting a color of at least portion of the image data corresponding to another portion of the lens distinct from a portion comprising a center of the lens.

15. The method of claim 9, wherein the adjusting of the color of the at least the portion of the image data comprises:

identifying at least one color gain corresponding to the identified intensity of the infrared light, based on at least one of first information corresponding to a specified first intensity of the infrared light or second information corresponding to a specified second intensity; and adjusting the color of the at least portion of the image data based on the at least one color gain.

16. An electronic device comprising:
an image sensor;
an infrared sensor; and
at least one processor operably coupled to the image sensor and the infrared sensor,
wherein the at least one processor is configured to:
receive first image data from the image sensor,
in response to the receiving of the first image data, identify a brightness and color temperature of the first image data,
identify an intensity of infrared light comprised in external light related to the first image data, from the infrared sensor, and
adjust a color of at least portion of second image data received from the image sensor after the receiving of the first image data, based on at least one of the identified brightness, color temperature, or intensity of the infrared light and based on application of a gain to a color of each of a plurality of pixels included in the image data, wherein the gain is determined by an interpolation of color gains included in a lens shading correction information, wherein the adjusting the color of the at least portion of the second image data comprises:

identifying whether the intensity of the infrared light comprised in the external light related to the first image data exceeds threshold determined based on the brightness of the first image data, and in response to identifying that the intensity of the infrared light exceeds the threshold, applying the gain to the color of each of the pixels to enhance red light compared to green light or blue light of the second image data, and wherein the threshold is determined so that the threshold has a larger value as the brightness of external light increases.

17. The electronic device of claim 16, wherein, the at least one processor is further configured to:

adjust the color of the at least portion of the second image data based on the intensity of the infrared light, and compensate for distortion of the second image data caused by a lens and an infrared filter through which external light arriving at the image sensor passes.

18. The electronic device of claim 16, wherein the at least one processor is further configured to:

in response to the identifying of the intensity of the infrared light, acquire information which comprises the color gains corresponding to respective mutually different pixels of the second image data, and based on the acquired information, adjust colors of the plurality of pixels comprised in the second image data.

19. The electronic device of claim 18, wherein the at least one processor is further configured to:

select information corresponding to the brightness, the color temperature and the intensity of the infrared light, among a plurality of specified information comprising the color gains, and based on the selected information, adjust colors of the plurality of pixels comprised in the second image data.

20. The electronic device of claim 19, wherein the at least one processor is further configured to adjust a color of at least portion of the second image data corresponding to another portion of a lens distinct from a portion comprising a center of the lens related to the image sensor, based on the selected information.

* * * * *